(12) United States Patent
Xu

(10) Patent No.: US 12,175,847 B1
(45) Date of Patent: *Dec. 24, 2024

(54) SECURITY CAMERAS INTEGRATING 3D SENSING FOR VIRTUAL SECURITY ZONE

(71) Applicant: Ambarella International LP, Santa Clara, CA (US)

(72) Inventor: Ruian Xu, San Jose, CA (US)

(73) Assignee: Ambarella International LP, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/533,758

(22) Filed: Dec. 8, 2023

Related U.S. Application Data

(63) Continuation of application No. 17/337,795, filed on Jun. 3, 2021, now Pat. No. 11,935,377.

(51) Int. Cl.
| | | |
|---|---|---|
| *G08B 13/196* | (2006.01) | |
| *G06T 7/521* | (2017.01) | |
| *G06V 10/44* | (2022.01) | |

(52) U.S. Cl.
CPC ........ *G08B 13/19652* (2013.01); *G06T 7/521* (2017.01); *G06V 10/44* (2022.01); *G08B 13/19643* (2013.01); *G08B 13/19669* (2013.01); *G08B 13/19682* (2013.01)

(58) Field of Classification Search
None
See application file for complete search history.

(56) References Cited

U.S. PATENT DOCUMENTS

| | | | | |
|---|---|---|---|---|
| 9,524,443 | B1* | 12/2016 | Kusens | G06V 10/143 |
| 9,892,611 | B1* | 2/2018 | Kusens | G06T 7/246 |
| 10,210,395 | B2* | 2/2019 | Kusens | H04N 7/181 |
| 11,040,619 | B1* | 6/2021 | Martin | G06T 7/593 |
| 11,109,152 | B2* | 8/2021 | Porta | G06V 10/764 |
| 11,128,840 | B1* | 9/2021 | Carter | G08B 13/19639 |
| 11,161,456 | B1* | 11/2021 | Day | B60R 1/26 |
| 11,498,500 | B1* | 11/2022 | Pertsel | G05D 1/0088 |
| 11,704,908 | B1* | 7/2023 | Xu | G06V 40/172 |
| | | | | 382/181 |
| 11,869,531 | B1* | 1/2024 | Berol | G06N 7/01 |
| 11,935,377 | B1* | 3/2024 | Xu | G08B 13/19643 |
| 2011/0115909 | A1* | 5/2011 | Sternberg | G06T 7/292 |
| | | | | 348/143 |
| 2011/0255743 | A1* | 10/2011 | Guan | G06V 20/582 |
| | | | | 382/103 |

(Continued)

*Primary Examiner* — Ricky Chin
(74) *Attorney, Agent, or Firm* — Maiorana Patent Law, PA

(57) ABSTRACT

An apparatus comprising an interface and a processor. The interface may be configured to receive pixel data corresponding to a monitored area. The processor may be coupled to the interface and may be configured to (i) process the pixel data arranged as video frames, (ii) perform computer vision operations to detect an object in the video frames, (iii) extract characteristics about the object detected, (iv) generate a three-dimensional (3D) map of the object utilizing the pixel data corresponding to the object, (v) determine whether the object is within a three-dimensional (3D) virtual security zone based on the 3D map of the object, and (vi) generate a trigger signal in response to all or a portion of the object being within the 3D virtual security zone. The 3D virtual security zone is generally determined by a user during a setup procedure.

20 Claims, 9 Drawing Sheets

(56) References Cited

U.S. PATENT DOCUMENTS

| | | | | |
|---|---|---|---|---|
| 2016/0021344 | A1* | 1/2016 | Renkis | H04L 67/10 |
| | | | | 901/1 |
| 2016/0165191 | A1* | 6/2016 | Rasheed | G08B 13/19608 |
| | | | | 348/143 |
| 2018/0122133 | A1* | 5/2018 | Narayan | G06T 19/20 |
| 2018/0144605 | A1* | 5/2018 | Kusens | A61B 5/1115 |
| 2019/0094365 | A1* | 3/2019 | Fujita | G01V 8/18 |
| 2019/0108405 | A1* | 4/2019 | Xu | G06V 20/52 |
| 2019/0205630 | A1* | 7/2019 | Kusens | A61B 5/6891 |
| 2019/0332897 | A1* | 10/2019 | Chen | G06T 7/215 |
| 2020/0011656 | A1* | 1/2020 | Hornung | G01S 17/88 |
| 2020/0193166 | A1* | 6/2020 | Russo | G06V 20/52 |
| 2020/0221054 | A1* | 7/2020 | Carey | H04N 5/265 |
| 2021/0127204 | A1* | 4/2021 | Porta | G06N 20/20 |
| 2021/0289168 | A1* | 9/2021 | Glückert et al. | H04N 23/667 |
| 2022/0187823 | A1* | 6/2022 | Ramasamy | B60W 30/09 |
| 2022/0215706 | A1* | 7/2022 | Wakako | G08B 13/19645 |
| 2022/0337883 | A1* | 10/2022 | Grois | H04N 19/134 |
| 2023/0046840 | A1* | 2/2023 | Ramanathan | G06T 7/80 |
| 2023/0344962 | A1* | 10/2023 | Tran | H04N 7/0127 |
| 2023/0360441 | A1* | 11/2023 | Kumar | G06V 40/20 |

* cited by examiner

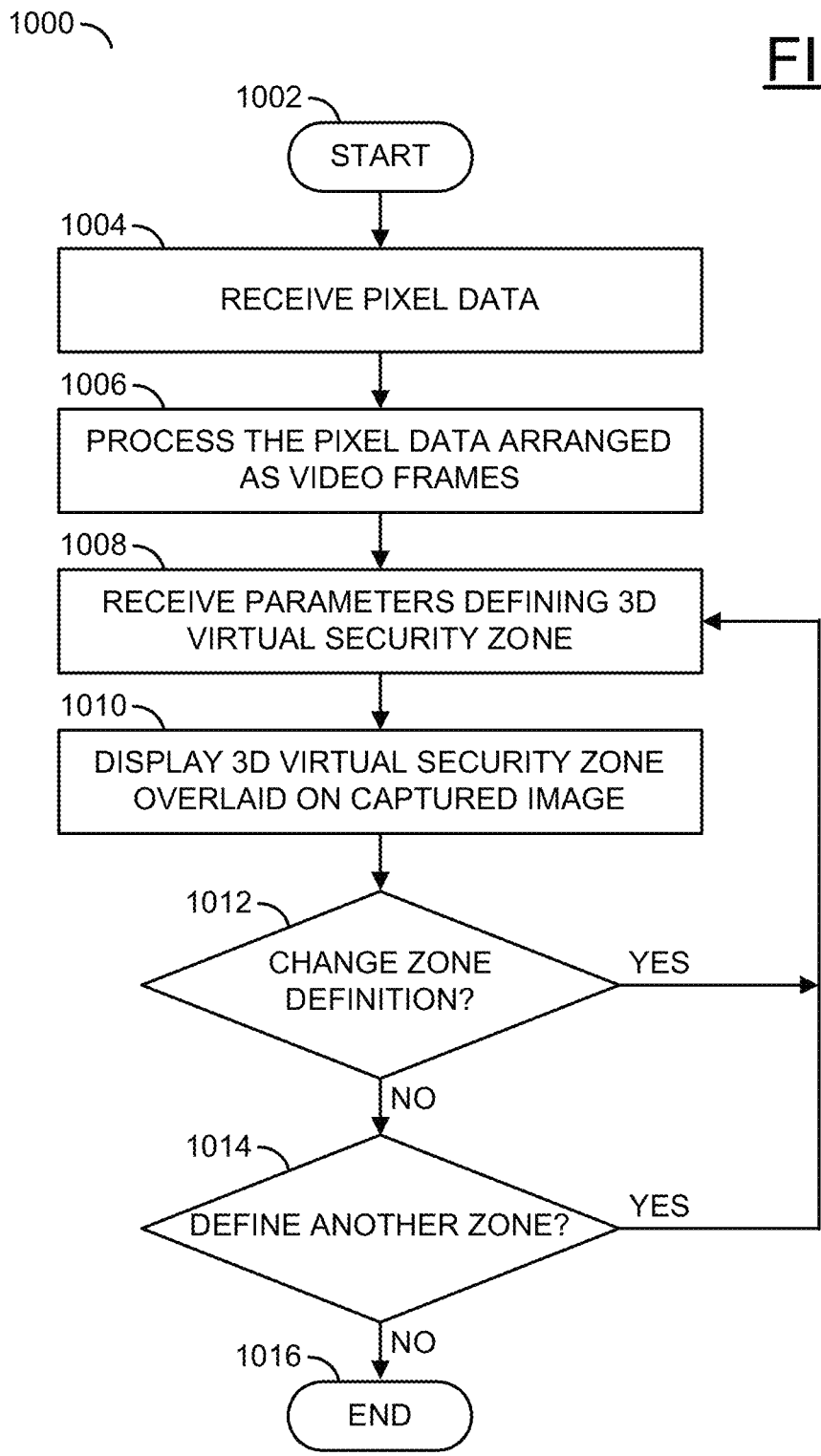

US 12,175,847 B1

SECURITY CAMERAS INTEGRATING 3D SENSING FOR VIRTUAL SECURITY ZONE

This application relates to U.S. patent application Ser. No. 17/337,795, filed Jun. 3, 2021, which is hereby incorporated by reference in its entirety.

FIELD OF THE INVENTION

The invention relates to security sensors generally and, more particularly, to a method and/or apparatus for implementing security cameras integrating 3D sensing for virtual security zone.

BACKGROUND

Home security systems integrate and rely more and more on security cameras. However, night time is still a large challenge to have the cameras be useful. Users/consumers typically turn off mobile phone notifications at night For security systems that integrate cameras, it is almost impossible to let the camera trigger the alarm system (or siren) directly due to a high amount of camera events (e.g. motion, car, person being detected). Conventional photoelectric sensors can act as trip wires, but are typically bulky and cannot be reliable outdoors as the light of the sensor is diffused by rain or fog.

It would be desirable to implement security cameras integrating 3D sensing for virtual security zone.

SUMMARY

The invention concerns an apparatus comprising an interface and a processor. The interface may be configured to receive pixel data corresponding to a monitored area. The processor may be coupled to the interface and may be configured to (i) process the pixel data arranged as video frames, (ii) perform computer vision operations to detect an object in the video frames, (iii) extract characteristics about the object detected, (iv) generate a three-dimensional (3D) map of the object utilizing the pixel data corresponding to the object, (v) determine whether the object is within a 3D virtual security zone based on the 3D map of the object, and (vi) generate a trigger signal in response to all or a portion of the object being within the 3D virtual security zone. The 3D virtual security zone is generally determined by a user during a setup procedure.

BRIEF DESCRIPTION OF THE FIGURES

Embodiments of the invention will be apparent from the following detailed description and the appended claims and drawings.

FIG. 10 is a flow diagram illustrating a method for defining a 3D virtual security zone in accordance with an example embodiment of the invention.

DETAILED DESCRIPTION OF THE EMBODIMENTS

Figure 1:
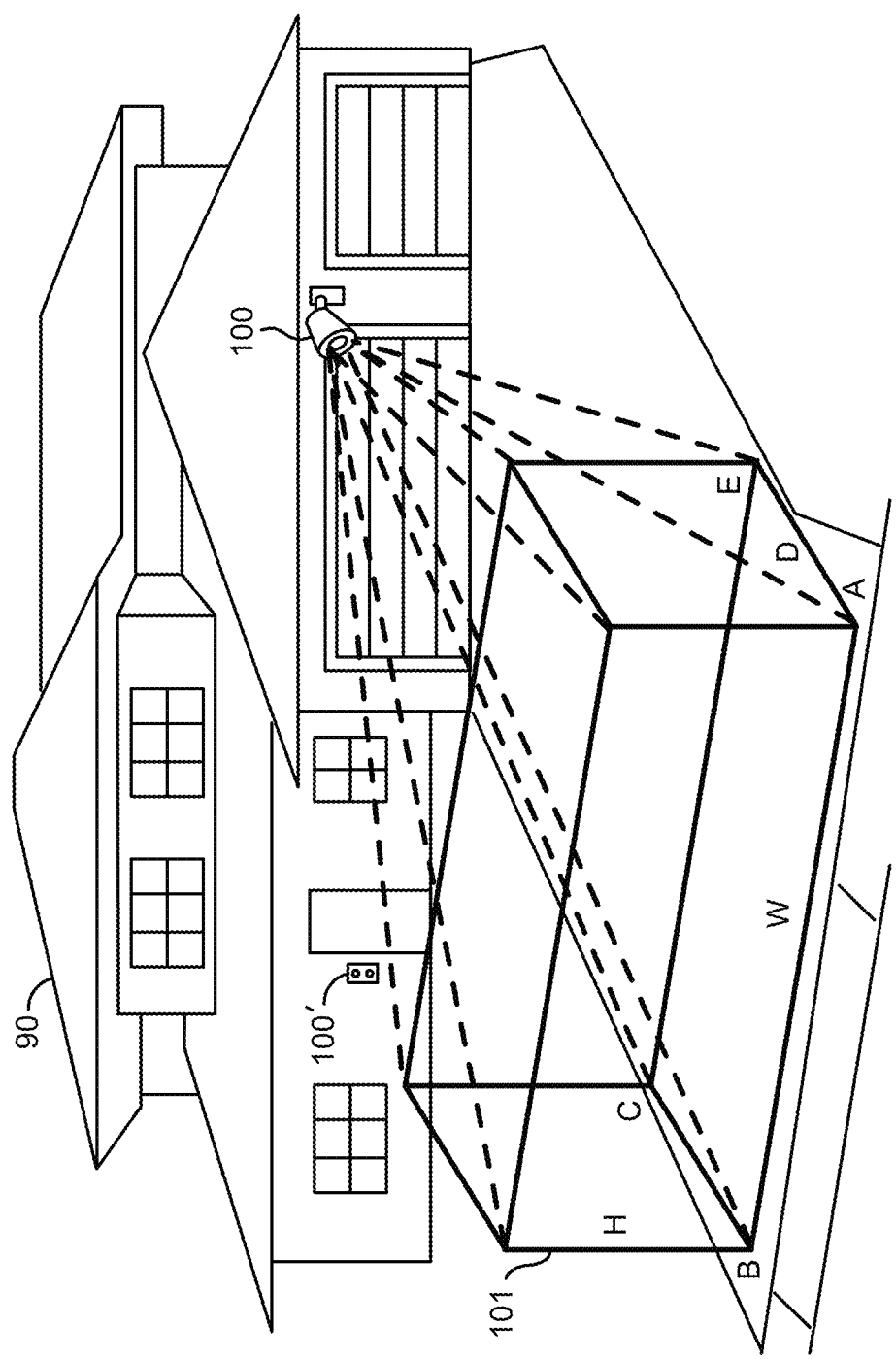
FIG. 1 is a diagram illustrating a context of an example embodiment of the invention.

Embodiments of the present invention include providing security cameras integrating 3D sensing for implementing a virtual security zone that may (i) utilize structured-light, time-of-flight (ToF), or stereo cameras, (ii) utilize 3D depth information to setup a virtual security zone, (iii) trigger a siren or a security system when the cameras detect intrusions in the virtual 3D security zone, (iv) provide preemptive security, (v) alert a homeowner, (vi) allow a dynamic virtual security zone to be setup to guard property, and/or (vii) be implemented as one or more integrated circuits.

In various embodiments, a camera system utilizes a built-in three-dimensional (3D) sensing capability to implement a 3D virtual security zone. The capability may be built into security cameras and/or doorbell cameras. In various embodiments, the camera system may comprise security cameras or doorbell cameras integrating 3D sensing such as structured-light, time-of-flight (ToF), or stereo cameras. In various embodiments, 3D depth information may be used to set up the 3D virtual security zone. When the camera system detects intrusion(s) into the 3D virtual security zone, a notification, a siren, or an existing security system may be triggered to provide preemptive security and/or alert the user/homeowner. In an example, one or more dynamic virtual security zones may also be set up to guard property. In an example, when a car is parked in the driveway, the user may select a virtual security zone that covers the car. Changes within and/or intrusions into the 3D virtual security zone(s) may be set to trigger the security notification, alarm system, and/or siren.

In various embodiments, a camera system utilizing a built-in three-dimensional (3D) sensing capability to implement a 3D virtual security zone may also incorporate a setup and/or training procedure that instructs (guides) the user/homeowner in setting up the one or more 3D virtual security zones. The capability may be built into the security cameras and/or doorbell cameras and/or provided through connection with cloud resources. In one example, the 3D virtual security zone(s) may be defined by the user/homeowner entering specific 3D spatial coordinates. In another example, the 3D virtual security zone(s) may be defined by the user/homeowner entering specific 3D spatial coordinates of an anchor point along with width height, and depth parameters. In yet another example, the 3D virtual security zone(s) may be defined by the user/homeowner modifying a default representation of the 3D virtual security zone(s) overlaid on a displayed image from the security cameras and/or doorbell cameras.

In an example, the user/homeowner may be enabled (e.g., through a user interface on a cellphone or other personal device) to define the 3D virtual security zone(s). In another example, the user/homeowner may be further enabled (e.g., through the user interface on the cellphone or other personal device) to modify the 3D virtual security zone(s). In an example, the user/homeowner may be enabled to modify the 3D virtual security zone(s) by moving lines indicating boundaries of the default 3D virtual security zone(s) until the representation encompasses a desired volume (or volumes) in a field of view of the security cameras and/or doorbell cameras. In still another example, the 3D virtual security zone(s) may be defined by the user/homeowner moving to various positions within the field of view of the security and/or doorbell camera(s) corresponding to vertices of the area upon which the 3D virtual security zone is to be based an marking the location (e.g., through the user interface on the cellphone or other personal device).

Referring to FIG. 1, a diagram is shown illustrating a context of an example embodiment of the invention. In an example, a residential setting may include a house 90. The house 90 may present a number of locations where virtual security zones may be desirable. In an example, a camera 100 may be placed at a location facing a driveway area. In another example, a camera 100' may be placed at a location facing a front door pathway. In an example, the camera 100 or 100' may be a battery-powered camera.

In an example embodiment, the camera 100 may be configured to cover a specific portion of a field of view (FOV). In an example, the portion of the field of view (FOV) monitored by the camera 100 may be configured to encompass an area including a portion of the driveway near the street. In an example, the camera 100 may comprise an image sensor and a camera system on chip (SoC). In an example, the image sensor may be directed toward the portion of the field of view to be monitored. In an example, the camera 100 may also include a passive infrared (PIR) sensor for motion detection. Passive infrared (PIR) sensors generally use very little power.

In an example operation, the passive infrared (PIR) sensor may be in an activated state and the image sensor may be in a non-activated stated. When an object moves in the field of view of the camera 100, the passive infrared (PIR) sensor may be triggered. In response to the PIR sensor being triggered, the camera SoC may turn on the image sensor and start generating a video stream comprising video captured from image sensor. In response to the PIR sensor being triggered, the camera SoC may begin performing computer vision operations on the video stream to determine whether the motion detected corresponds to a change within and/or an intrusion into the 3D virtual security zone. In response to the motion detected corresponding to a change within and/or an intrusion into the 3D virtual security zone, the camera SoC may be configured to provide (generate) a trigger signal. The trigger signal may be configured to trigger a security notification, alarm system, and/or siren.

In various embodiments, a camera system utilizing a built-in three-dimensional (3D) sensing capability to implement a 3D virtual security zone may incorporate a setup and/or training procedure that instructs (guides) the user/homeowner in setting up the one or more 3D virtual security zones. The capability may be built into the security camera 100 and/or doorbell camera 100' and/or provided through connection with cloud resources. In one example, the 3D virtual security zone(s) may be defined by the user/homeowner entering specific 3D spatial coordinates (e.g., A, B, C, E, H) defining the 3D virtual security zone(s). In another example, the 3D virtual security zone(s) may be defined by the user/homeowner entering specific 3D spatial coordinates of an anchor point (e.g., A) along with a width parameter (e.g., W), a height parameter (e.g., H), and a depth parameter (e.g., D) parameter. Other types of dimension parameters (e.g., radial distance, degrees of arc, etc.) may be implemented accordingly. In yet another example, the 3D virtual security zone(s) may be defined by the user/homeowner modifying a default representation of the 3D virtual security zone(s) overlaid on a displayed image from the security camera 100 and/or doorbell camera 100'.

In an example, the user/homeowner may be enabled (e.g., through a user interface on a cellphone or other personal computing device) to define the 3D virtual security zone(s). In another example, the user/homeowner may be further enabled (e.g., through the user interface on the cellphone or other personal device) to modify the 3D virtual security zone(s). In an example, the user/homeowner may be enabled to modify the 3D virtual security zone(s) by moving lines indicating boundaries of the default 3D virtual security zone(s) until the representation encompasses a desired volume (or volumes) in a field of view of the security cameras and/or doorbell cameras. In still another example, the 3D virtual security zone(s) may be defined by the user/homeowner moving to various positions within the field of view of the security camera 100 and/or doorbell camera 100' corresponding to the vertices of the area upon which the 3D virtual security zone is to be based, and marking each of the locations (e.g., through the user interface on the cellphone or other personal device). In another example, the user/homeowner may be enabled to program a number of 3D virtual security zones, which the security camera 100 and/or doorbell camera 100' may automatically switch between (e.g., based on time of day, day of week, presence of pre-defined objects, etc.).

Figure 2:
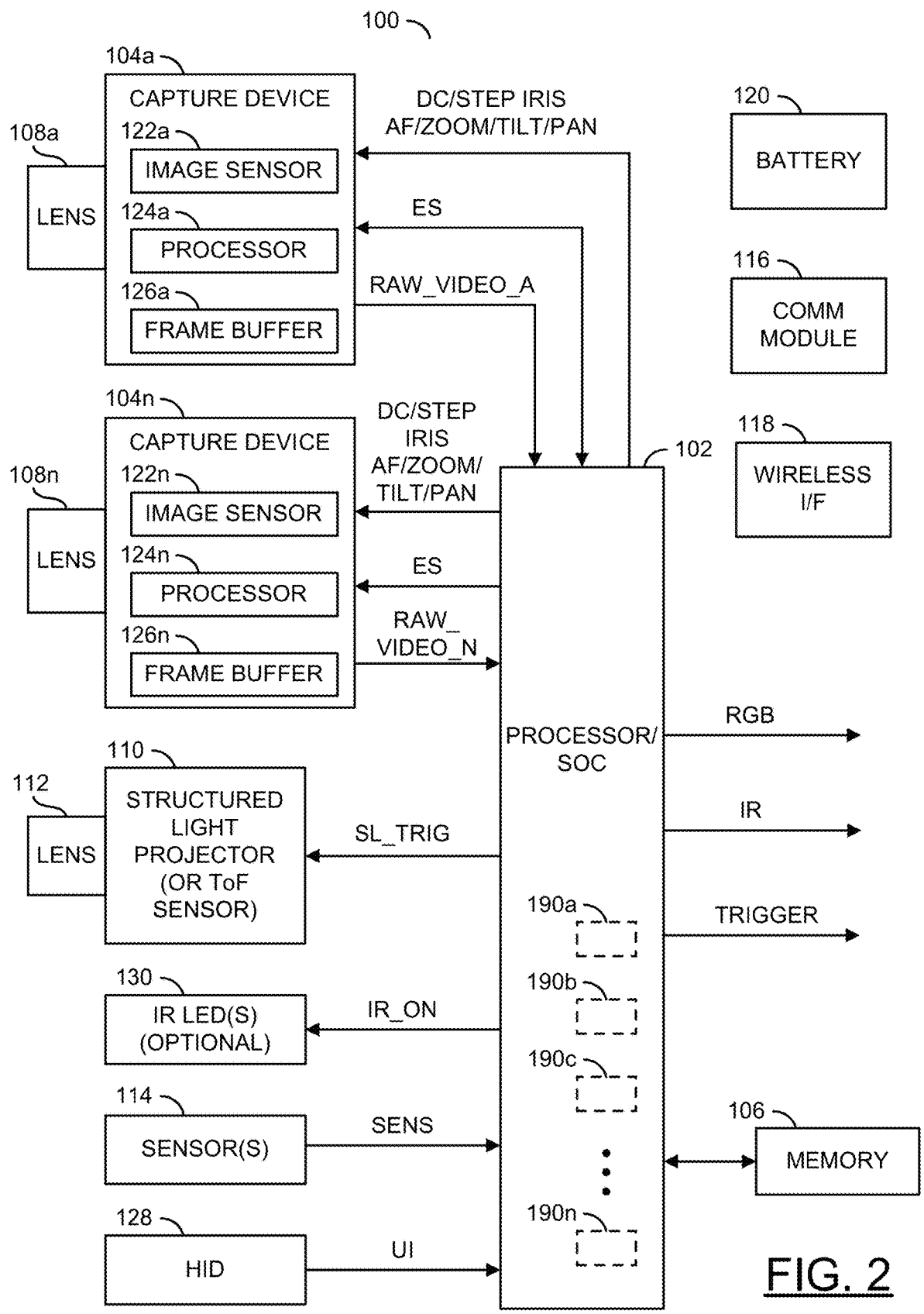
FIG. 2 is a diagram illustrating elements of a system in accordance with an example embodiment of the invention.

Referring to FIG. 2, a block diagram is shown illustrating an example implementation of a camera system in accordance with an example embodiment of the invention. In an example, the camera system 100 may comprise a block (or circuit) 102, one or more blocks (or circuits) 104a-104n, a block (or circuit) 106, one or more blocks 108a-108n, a block (or circuit) 110, a block (or circuit) 112, a block (or circuit) 114, a block (or circuit) 116, a block (or circuit) 118, and/or a block (or circuit) 120. The circuit 102 may be implemented as a processor and/or System on Chip (SoC). The one or more circuits 104a-104n may be implemented as capture devices. The circuit 106 may be implemented as a memory. The one or more blocks 108a-108n may be implemented as optical lenses. The circuit 110 may be implemented as a structured light projector. The block 112 may be implemented as a structured light pattern lens. The circuit 114 may be implemented as one or more sensors (e.g., motion, ambient light, proximity, sound, etc.). The circuit 116 may be implemented as a communication device. The circuit 118 may be implemented as a wireless interface. The circuit 120 may be implemented as a battery 120.

In some embodiments, the camera system 100 may comprise the processor/SoC 102, the capture devices 104a-104n, the memory 106, the lenses 108a-108n, the IR structured light projector 110, the lens 112, the sensors 114, the communication module 116, the wireless interface 118, and the battery 120. In another example, the camera system 100 may comprise the capture devices 104a-104n, the lenses 108a-108n, the IR structured light projector 110, the lens 112, and the sensors 114, and the processor/SoC 102, the memory 106, the communication module 116, the wireless interface 118, and the battery 120 may be components of a separate device. The implementation of the camera system 100 may be varied according to the design criteria of a particular implementation.

The lenses 108a-108n may be attached to the capture devices 104a-104n, respectively. In an example, the capture devices 104a-104n may comprise blocks (or circuits) 122a-122n, blocks (or circuits) 124a-124n, and blocks (or circuits) 126a-126n. The circuits 122a-122n may implement an image sensor. In an example, the image sensor of the circuits 122a-122n may be an IR image sensor, a color (RGB) image sensor, or an RGB-IR image sensor. The circuits 124a-124n may implement a processor and/or logic. The circuits 126a-126n may be a memory circuit (e.g., a frame buffer, instruction stack, etc.).

The capture devices 104a-104n may be configured to capture video image data (e.g., light collected and focused by the lenses 108a-108n). The capture devices 104a-104n may capture data received through the lenses 108a-108n to generate a video bitstream (e.g., a sequence of video frames). In various embodiments, the lenses 108a-108n may be implemented as a fixed focus lenses. A fixed focus lenses generally facilitates smaller size and low power. In an example, a fixed focus lenses may be used in battery powered, doorbell, and other low power camera applications. In some embodiments, the lenses 108a-108n may be directed, tilted, panned, zoomed and/or rotated to capture the environment surrounding the camera system 100 (e.g., capture data from the field of view). In an example, professional camera models may be implemented with an active lenses system for enhanced functionality, remote control, etc.

The capture devices 104a-104n may transform the received light into a digital data stream. In some embodiments, the capture devices 104a-104n may perform an analog to digital conversion. For example, the image sensors 122a-122n may perform a photoelectric conversion of the light received by the lenses 108a-108n. The processor/logic 124a-124n may transform the digital data stream into a video data stream (or bitstream), a video file, and/or a number of video frames. In an example, the capture devices 104a-104n may present the video data as digital video signals (e.g., RAW_VIDEO_A-RAW_VIDEO_N). The digital video signals RAW_VIDEO_A-RAW_VIDEO_N may comprise the video frames (e.g., sequential digital images and/or audio).

The video data captured by the capture devices 104a-104n may be represented as a signal/bitstream/data communicated by the digital video signals RAW_VIDEO_A-RAW_VIDEO_N. The capture devices 104a-104n may present the digital video signals RAW_VIDEO_A-RAW_VIDEO_N to the processor/SoC 102. The digital video signals RAW_VIDEO_A-RAW_VIDEO_N may represent the video frames/video data. The digital video signals RAW_VIDEO_A-RAW_VIDEO_N may be a video stream captured by the capture devices 104a-104n.

The image sensors 122a-122n may receive light from the lenses 108a-108n and transform the light into digital data (e.g., the bitstream). For example, the image sensors 122a-122n may perform a photoelectric conversion of the light from the lenses 108a-108n. In some embodiments, the image sensors 122a-122n may have extra margins that are not used as part of the image output. In some embodiments, the image sensors 122a-122n may not have extra margins. In various embodiments, the image sensors 122a-122n may be configured to generate one or more of an infrared (IR) video signal, a color (RGB) video signal, and/or an RGB-IR video signal. In an infrared light only illuminated field of view, one or more of the image sensors 122a-122n may generate a monochrome (B/W) video signal. In a field of view illuminated by both IR light and visible light, one or more of the image sensors 122a-122n may be configured to generate color information in addition to the monochrome video signal. In various embodiments, the image sensors 122a-122n may be configured to generate video signals in response to visible light and/or infrared (IR) radiation.

The processors/logic 124a-124n may transform the bitstream into a human viewable content (e.g., video data that may be understandable to an average person regardless of image quality, such as the video frames). For example, the processors/logic 124a-124n may receive pure (e.g., raw) data from the image sensors 122a-122n and generate (e.g., encode) video data (e.g., the bitstream) based on the raw data. The capture devices 104a-104n may have the memories 126a-126n to store the raw data and/or the processed bitstream. For example, the capture devices 104a-104n may implement a frame memory and/or buffer in the memories 126a-126n to store (e.g., provide temporary storage and/or cache) one or more of the video frames (e.g., the digital video signals). In some embodiments, the processors/logic 124a-124n may perform analysis and/or correction on the video frames stored in the memories/buffers 126a-126n of the capture devices 104a-104n.

The sensors 114 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 114 may be configured to detect motion anywhere in the field of view monitored by the camera system 100. In various embodiments, the detection of motion may be used as one threshold for activating the capture devices 104a-104n. The sensors 114 may be implemented as an internal component of the camera system 100 and/or as a component external to the camera system 100. In an example, the sensors 114 may be implemented as a passive infrared (PIR) sensor. In another example, the sensors 114 may be implemented as a smart motion sensor. In embodiments implementing the smart motion sensor, the sensors 114 may comprise a low resolution image sensor configured to detect motion and/or persons.

In various embodiments, the sensors 114 may generate a signal (e.g., SENS). The signal SENS may comprise a variety of data (or information) collected by the sensors 114. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 114 may generate (assert) the signal SENS when motion is detected in the field of view monitored by the camera system 100. In another example, the sensors 114 may generate (assert) the signal SENS when triggered by audio in the field of view monitored by the camera system 100. In still another example, the sensors 114 may be configured to provide directional information with respect to motion and/or sound detected in the field of view. The directional information may also be communicated to the processor/SoC 102 via the signal SENS.

The processor/SoC 102 may be configured to execute computer readable code and/or process information. In various embodiments, the computer readable code may be stored within the processor/SoC 102 (e.g., microcode, etc.)

and/or in the memory 106. In an example, the processor/SoC 102 may be configured to execute one or more artificial neural network models (e.g., facial recognition CNN, object detection CNN, object classification CNN, etc.) stored in the memory 106. In an example, the memory 106 may store one or more directed acyclic graphs (DAGs) and one or more sets of weights defining the one or more artificial neural network models. The processor/SoC 102 may be configured to receive input from and/or present output to the memory 106. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The processor/SoC 102 may receive the signals RAW_VIDEO_A-RAW_VIDEO_N and the signal SENS. In an example, the processor/SoC 102 may generate one or more video output signals (e.g., IR, RGB, etc.) and one or more control signals (e.g., TRIGGER) based on the signals RAW_VIDEO_A-RAW_VIDEO_N, the signal SENS, and/or other input. In some embodiments, the signals IR, RGB, and TRIGGER may be generated based on analysis of the signals RAW_VIDEO_A-RAW_VIDEO_N and/or objects detected in the signals RAW_VIDEO_A-RAW_VIDEO_N. In an example, the signal RGB generally comprises color images (frames) in either an RGB or YUV color space. In an example, the signal RGB may be generated when the processor/SoC 102 is operating in a day mode. In an example, the signal IR generally comprises IR monochrome images (frames). In one example, the signal IR may comprise non-contaminated IR images (e.g., no structured light pattern) using ambient IR light when the processor/SoC 102 is operating in a day mode. In another example, the signal IR may comprise non-contaminated IR images (e.g., no structured light pattern) using optional IR LED illumination (e.g., from IR LEDs 130) when the processor/SoC 102 is operating in a night mode. In yet another example, the signal IR may comprise contaminated IR images (e.g., the structured light pattern is present in at least a portion of the image) when the structured light projector 110 is turned on and the processor/SoC 102 is operating in either the day mode or night mode.

In various embodiments, the processor/SoC 102 may be configured to perform one or more of feature extraction, object detection, object tracking, and object identification. For example, the processor/SoC 102 may determine motion information and/or depth information by analyzing a frame from the signals RAW_VIDEO_A-RAW_VIDEO_N and comparing the frame to a previous frame. The comparison may be used to perform digital motion estimation and/or disparity measurement. In some embodiments, the processor/SoC 102 may be configured to generate the video output signals RGB and IR comprising video data from the signals RAW_VIDEO_A-RAW_VIDEO_N. The video output signals RGB and IR may be presented to the memory 106, the communications module 116, and/or the wireless interface 118. The signal TRIGGER may be configured to indicate when an object present in the images communicated by the signals RGB and IR is in a pre-defined 3D virtual security zone.

The memory 106 may store data. The memory 106 may implement various types of memory including, but not limited to, a cache, flash memory, memory card, random access memory (RAM), dynamic RAM (DRAM) memory, etc. The type and/or size of the memory 106 may be varied according to the design criteria of a particular implementation. The data stored in the memory 106 may correspond to a video file, motion information (e.g., readings from the sensors 114), parameters, image stabilization parameters, user inputs, computer vision models, and/or metadata information.

The lenses 108a-108n (e.g., camera lenses) may be directed to provide a view of an environment surrounding the camera system 100. The lenses 108a-108n may be aimed to capture environmental data (e.g., light). The lenses 108a-108n may be wide-angle lenses and/or fish-eye lenses (e.g., lenses capable of capturing a wide field of view). The lenses 108a-108n may be configured to capture and/or focus the light for the capture devices 104a-104n. Generally, the image sensors 122a-122n is located behind the lenses 108a-108n. Based on the captured light from the lenses 108a-108n, the capture devices 104a-104n may generate a bitstream and/or video data.

The communications module 116 may be configured to implement one or more communications protocols. For example, the communications module 116 and the wireless interface 118 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the wireless interface 118 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 116 and wireless interface 118 may be a wireless communications protocol. The type of communications protocols implemented by the communications module 116 may be varied according to the design criteria of a particular implementation.

The communications module 116 and/or the wireless interface 118 may be configured to generate a broadcast signal as an output from the camera system 100. The broadcast signal may send the video data RGB and/or IR, and/or the signal TRIGGER to external devices. For example, the broadcast signal may be sent to a cloud storage service (e.g., a storage service capable of scaling on demand). In some embodiments, the communications module 116 may not transmit data until the processor/SoC 102 has performed video analytics to determine that an object is within a pre-defined #D virtual security zone in the field of view of the camera system 100.

In some embodiments, the communications module 116 may be configured to generate a manual control signal. The manual control signal may be generated in response to a signal from a user received by the communications module 116. The manual control signal may be configured to activate the processor/SoC 102. The processor/SoC 102 may be activated in response to the manual control signal regardless of the power state of the camera system 100.

In some embodiments, the camera system 100 may include a battery 120 configured to provide power for the various components of the camera system 100. A multi-step approach to activating and/or disabling the capture devices 104a-104n based on the output of the motion sensor 114 and/or any other power consuming features of the camera system 100 may be implemented to reduce a power consumption of the camera system 100 and extend an operational lifetime of the battery 120. A motion sensor of the sensors 114 may have a very low drain on the battery 120 (e.g., less than 10 µW). In an example, the motion sensor of the sensors 114 may be configured to remain on (e.g., always active) unless disabled in response to feedback from the processor/SoC 102. Video analytics performed by the processor/SoC 102 may have a large drain on the battery 120 (e.g., greater than the motion sensor 114). In an example, the processor/SoC 102 may be in a low-power state (or power-down) until some motion is detected by the motion sensor of the sensors 114.

The camera system 100 may be configured to operate using various power states. For example, in the power-down state (e.g., a sleep state, a low-power state) the motion sensor of the sensors 114 and the processor/SoC 102 may be on and other components of the camera system 100 (e.g., the image capture devices 104a-104n, the memory 106, the communications module 116, etc.) may be off. In another example, the camera system 100 may operate in an intermediate state. In the intermediate state, the image capture devices 104a-104n may be on and the memory 106 and/or the communications module 116 may be off. In yet another example, the camera system 100 may operate in a power-on (or high power) state. In the power-on state, the sensors 114, the processor/SoC 102, the capture devices 104a-104n, the memory 106, and/or the communications module 116 may be on. The camera system 100 may consume some power from the battery 120 in the power-down state (e.g., a relatively small and/or minimal amount of power). The camera system 100 may consume more power from the battery 120 in the power-on state. The number of power states and/or the components of the camera system 100 that are on while the camera system 100 operates in each of the power states may be varied according to the design criteria of a particular implementation.

In some embodiments, the camera system 100 may include a keypad, a touch pad (or screen), a doorbell switch, and/or other human interface devices (HIDs) 128. In an example, the sensors 114 may be configured to determine when an object is in proximity to the HIDs 128. In an example where the camera system 100 is implemented as part of an access control application, the capture devices 104a-104n may be turned on to provide images for identifying a person attempting access, and illumination of a lock area, and/or for an access touch pad may be turned on.

In various embodiments, a low cost 3D sensing platform may be provided. The low cost 3D sensing platform may facilitate development of intelligent security monitoring and/or access control systems and smart security products such as smart video doorbells and door locks, alarm systems, etc. In various embodiments, the low cost 3D sensing platform may include a vision system on chip (SoC), structured light projector, an IR, RGB, and/or RGB-IR image sensor, and/or a time-of-flight (ToF) sensor. In various embodiments, an RGB-IR CMOS image sensor may be utilized to obtain both a visible light image and an infrared (IR) image, for viewing and facial recognition, and also utilize the infrared (IR) image for depth sensing. In an example, the vision SoC may provide depth processing, anti-spoofing algorithms, 3D facial recognition algorithms, and video encoding on a single chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

In various embodiments, system cost may be reduced by using an RGB-IR sensor (e.g., one sensor and one lenses versus two sensors and two lenses). In some embodiments, system cost may be further reduced by using an RGB-IR rolling shutter sensor (e.g., rolling shutter vs. global shutter). By controlling the structured light projector through software, the time sequence may be adjusted easily, providing improved flexibility. Power savings may be realized because the structured light projector may be used briefly by the software.

In various embodiments, a low cost structured light based 3D sensing system may be implemented. In an example, the 3D information may be used for 3D modeling and liveness determination. In an example, the low cost structured light based 3D sensing system may be used to lock/unlock a door, arm/disarm an alarm system, and/or allow "tripwire" control of access to a restricted region (e.g., a garden, a vehicle, a garage, a house, etc.). In one example, the low cost structured light based 3D sensing system may be configured to recognize gardener/pool maintenance person and inhibit triggering an alarm. In another example, the low cost structured light based 3D sensing system may be configured to limit access to certain times and days of the week. In another example, the low cost structured light based 3D sensing system may be configured to trigger an alarm upon recognition of certain objects (e.g. restraining order is out against ex-spouse, alert 911 if that person is detected). In another example, the low cost structured light based 3D sensing system may be configured to allow alarm system re-programming privilege based on video/audio identification (e.g., only person X or Y is permitted to change access level or policy, add users, etc. even if the correct password is entered).

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data RAW_VIDEO_A-RAW_VIDEO_N, generate the video frames from the pixel data, perform various operations on the video frames (e.g., de-warping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n and/or other components of the camera system 100 may be described in association with U.S. patent application Ser. No. 15/931,942, filed on May 14, 2020, U.S. patent application Ser. No. 16/831,549, filed on Mar. 26, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, etc.) to be performed locally on the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement a convolutional neural network (CNN) module. The CNN module 190b may be configured to perform the computer vision operations on the video frames. The CNN module 190b may be configured to implement recognition of the objects and/or events through multiple layers of feature detection. The CNN module 190b may be configured to calculate descriptors based on the feature detection performed. The descriptors may enable the processor 102 to determine a likelihood that pixels of the video frames correspond to particular objects (e.g., the people, pets, items, text, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 190b as a dedicated hardware module of the processor 102 may enable the camera system 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object to match against (e.g., reference objects) may be customized using an open operand stack (enabling programmability of the processor 102 to implement various directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 108a-108n may represent one coordinate (e.g., a location coordinate on a third axis) for a depth location of the body part in 3D space. Using the location of various body parts in 3D space, the processor 102 may determine body position, and/or body characteristics of the people in a field of view of the camera system 100.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The hardware modules 190a-190n may execute data flows directed to computer vision, feature extraction, and feature matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

In some embodiments, one or more of the hardware modules 190a-190n may be configured to implement a disparity engine. The disparity engine may be configured to determine a distance based on images captured as a stereo pair. Two or more of the capture devices 104a-104n may be configured as a stereo pair of cameras. The capture devices 104a-104n configured as a stereo pair may be implemented close to each other at a pre-defined distance and/or have a symmetrical orientation about a central location. The capture devices 104a-104n configured as a stereo pair may be configured to capture video frames from similar, but slightly different perspectives (e.g., angled inwards to capture fields of view that overlap).

The disparity engine implemented by the hardware modules 190a-190n may be configured to perform a comparison to analyze the differences between the stereo pair of images. In an example, the processor 102 may detect feature points of the same object detected in both video frames captured by the capture devices 104a-104n configured as a stereo pair. The disparity engine may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 104a-104n configured as a stereo pair, the disparity engine may be configured to determine a distance. The distance determined by the disparity engine may be the distance from the capture devices 104a-104n configured as a stereo pair. In an example, the disparity engine may determine a distance from the capture devices 104a-104n configured as a stereo pair to a particular object (e.g., a vehicle, a bicycle, a pedestrian, a plant, a decoration, etc.) based on the comparison of the differences in the stereo pair of images captured.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 3:
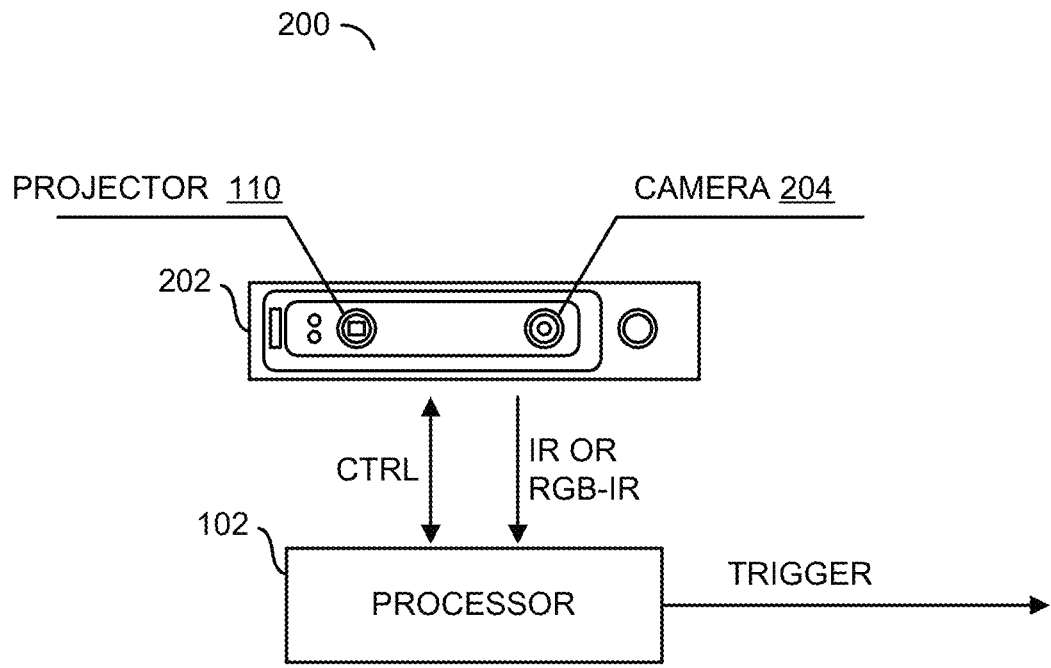
FIG. 3 is a diagram illustrating a mono camera structured-light system in accordance with an example embodiment of the invention.

Referring to FIG. 3, a diagram is shown illustrating a mono camera structured-light system in accordance with an example embodiment of the invention. In an example, the mono camera structured-light system 200 may be used to implement the camera system 100. In an example, the mono camera structured-light system 200 may include a housing 202, a camera 204, the processor 102, and the infrared (IR) structured light projector 110. The infrared (IR) structured light projector 110, including the lens 112, and the camera 204, including the lens 108a and the capture device 104a, may be mounted in the housing 202. In one example, the processor 102 may also be mounted within the housing 202. In another example, the processor 102 may be located externally or remotely to the housing 202. The IR structured light projector 110 may be configured, when turned on, to project a structured light pattern (SLP) on objects in the field of view of the mono camera structured-light system 200. The IR image sensor or RGB-IR image sensor of the capture device 104a may be used to acquire IR image data (with and without the structured light pattern) for the objects in the field of view of the mono camera structured-light system 200. The RGB-IR image sensor, if implemented, of the capture device 104a may be used to acquire both IR image data (with and without the structured light pattern) and RGB image data (without the structured light pattern) for the objects in the field of view of the mono camera structured-light system 200. The mono camera structured-light system 200 generally provides advantages over conventional two camera 3D sensing systems. By utilizing an RGB-IR image sensor to obtain both RGB and IR image data with and without a structured light pattern (SLP), the mono camera structured-light system 200 may reduce the system cost and the system complexity relative to conventional systems (e.g., one sensor and one lens versus two sensors and two lenses).

In an example, the processor 102 may utilize RGB-IR data from the RGB-IR sensor of the capture device 104a that has been separated (split) into a first image data channel comprising IR image data with the structured light pattern present and a second image data channel comprising RGB and/or IR image data without the structured light pattern present. In an example, the first and second image data channels may be processed by the processor 102 for 3D (e.g., depth) perception, liveness determination, 3D facial recognition, object detection, face detection, object identification, and facial recognition. In an example, the first image data channel having the IR image data with the structured light pattern present may be used to perform a structured light projector mounting calibration process in accordance with an example embodiment of the invention. The first image data channel having the IR image data with the structured light pattern present may also be used to perform depth analysis, liveness determination, and/or 3D facial recognition. In an example, the processor 102 may be configured to generate a disparity map. The second image data channel, having the IR image data without the structured light pattern present and the RGB image data without the structured light pattern present, may be used to generate an encoded (or compressed) video signal, bitstream, or multiple bitstreams, and to perform object detection, face detection, object identification, and/or facial recognition. In an example, the processor 102 may utilize the disparity to determine when changes in or intrusion into the 3D virtual security zone 101 have occurred. In another example, the processor 102 may be configured to generate the disparity map for just the 3D virtual security zone 101 in order to reduce computation costs and increase response speed. In an example, when the processor 102 determines changes in or intrusion into the 3D virtual security zone 101 have occurred, the processor may generate (or assert) the signal TRIGGER.

Figure 4:
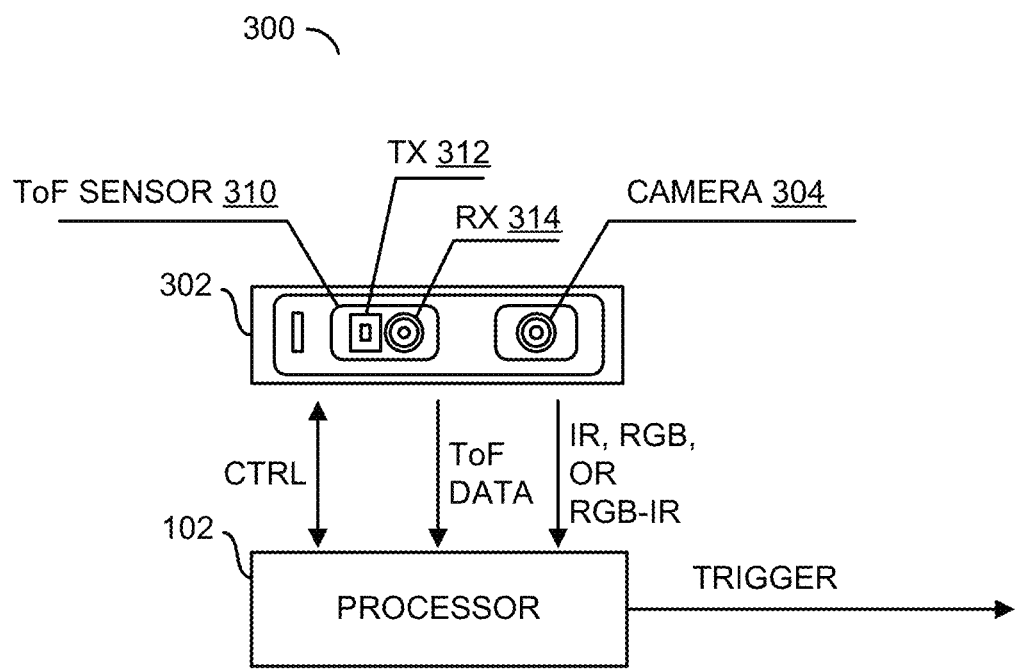
FIG. 4 is a diagram illustrating a Time-of-Flight camera system in accordance with an example embodiment of the invention.

Referring to FIG. 4, a diagram is shown illustrating a Time-of-Flight (ToF) camera system 300 in accordance with an example embodiment of the invention. In an example, the ToF camera system 300 may be used to implement the camera system 100. In an example, the ToF camera system 300 may include a housing 302, a camera 304, a ToF sensor (or camera) 310, and the processor 102. In an example, the camera 304 may comprise the capture device 104a and the lens 108a. The ToF sensor 310 may comprise a transmitter 312 and a receiver (camera) 314. The camera 304, including the capture device 104a and the lens 108a, and the ToF sensor 310 may be mounted in the housing 302. In one example, the processor 102 may also be mounted within the housing 302. In another example, the processor 102 may be located externally or remotely to the housing 302.

In an example, the ToF sensor 310 generally implements a range imaging camera system employing time-of-flight techniques. The ToF sensor 310 generally resolves distance between the camera 304 and an object for each point of an image by measuring a round trip time of an artificial light signal provided by a laser or a light emitting diode (LED). Laser-based time-of-flight sensors are part of a broader class of scannerless LIDAR, in which an entire scene may be captured with each laser pulse, as opposed to point-by-point with a laser beam in a scanning LIDAR system. In an example, the ToF Sensor 310 may provide a distance resolution of about 1 cm.

In an example, the TOF sensor 310 may use infrared (IR) radiation, which is invisible to human eyes, to determine depth information. The transmitter 312 of the TOF sensor 310 may emit an IR signal, which hits an object in the field of view of the camera system 300 and returns to the receiver 314 of the TOF sensor 310. The amount of time the IR signal takes to bounce back may then be measured to provide a depth-mapping capability. The ToF sensor 310 may provide an advantage over other technologies, as the ToF sensor 310 may accurately measure distances in a complete scene with a single laser pulse.

In comparison to other 3D-depth range scanning technologies available, such as the structured-light projector 110 and camera 204 in the camera system 200, TOF technology is relatively inexpensive. In an example, ToF sensors may reach up to 160 frames per second, providing for real-time applications. TOF sensors generally use a small amount of processing power. Once distance data has been collected, features like object detection may be easily implemented with computer vision algorithms. In an example, multiple TOF sensors may be implemented to create a "point cloud" of the field of view of the camera system 300.

The IR image sensor or RGB-IR image sensor of the capture device 104a may be used to acquire IR image data in addition to the depth data for objects in the field of view of the camera system 300. The RGB-IR image sensor, if implemented, of the capture device 104a may be used to acquire both IR image data and RGB image data for the objects in the field of view of the camera system 300. The camera system 300 may provide advantages over conventional two camera 3D sensing systems. By utilizing an RGB-IR image sensor to obtain both RGB and IR image data with and without the depth data from the TOF sensor 310, the camera system 300 may reduce the system cost and the system complexity relative to conventional systems (e.g., one image sensor and one lens versus two image sensors and two lenses).

In an example, the processor 102 may utilize RGB-IR data from the RGB-IR sensor of the capture device 104a that has been separated (split) into a first image data channel comprising IR image data and a second image data channel comprising RGB image data. In an example, the depth data from the ToF sensor 310 may be processed by the processor 102 for 3D (e.g., depth) perception, liveness determination, 3D facial recognition, object detection, face detection, object identification, and facial recognition. In an example, the processor 102 may be configured to generate a disparity map. The first image data channel, having the IR image data, and the second image channel, having the RGB image data, may be used to generate an encoded (or compressed) video signal, bitstream, or multiple bitstreams, and to perform object detection, face detection, object identification, and/or facial recognition. In an example, the processor 102 may utilize the disparity to determine when changes in or intrusion into the 3D virtual security zone 101 have occurred. In another example, the processor 102 may be configured to generate the disparity map for just the 3D virtual security zone 101 in order to reduce computation costs and increase response speed. In an example, when the processor 102 determines changes in or intrusion into the 3D virtual security zone 101 have occurred, the processor may generate (or assert) the signal TRIGGER.

Figure 5:
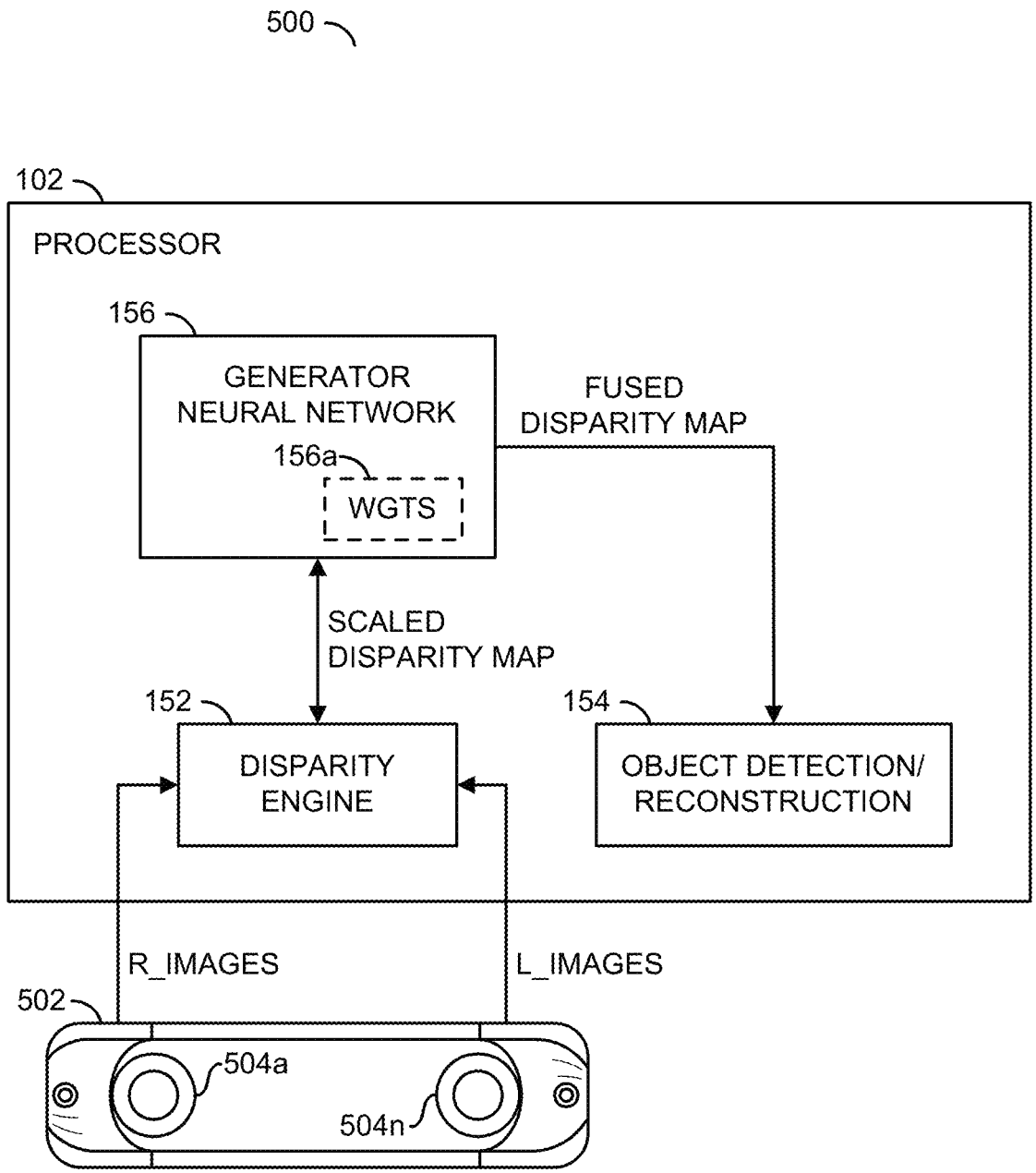
FIG. 5 is a diagram illustrating a stereo camera system in accordance with an example embodiment of the invention.

Referring to FIG. 5, a diagram is shown illustrating a stereo camera system 500 in accordance with an example embodiment of the invention. In an example, the stereo camera system 500 may be used to implement the security camera 100 and/or the doorbell camera 100'. In an example, the stereo camera system 500 may comprise a housing 502, a camera 504a, a camera 504n, and the processor 102. The camera 504a may comprise the capture device 104a and the lens 108a. The camera 504n may comprise the capture device 104n and the lens 108n. The camera 504a, including the capture device 104a and the lens 108a, and the camera 504n, including the capture device 104n and the lens 108n, may be mounted in the housing 502. In one example, the processor 102 may also be mounted within the housing 502. In another example, the processor 102 may be located externally or remotely to the housing 502.

In an example, the processor 102 may be configured to received images from a camera 504a and the camera 504n. In an example, the processor 102 may receive a first signal (e.g., R_IMAGES) and a second signal (e.g., L_IMAGES) from the camera assembly 90. The signal R_IMAGES may communicate a first subset of images from the camera 504a to the processor 102. The signal L_IMAGES may communicate a second subset of images from the camera 504n to the processor 102. In an example where the camera system 500 is configured as a stereo camera, the signals R_IMAGES and L_IMAGES may comprise corresponding right and left images, respectively, captured by the camera system 500. In an example embodiment, the camera 504a and the camera 504n may be configured as a stereo camera pair. For example, the camera 504a and the camera 504n may be mounted such that an optical axis of the first camera 504a and an optical axis of the second camera 504n are at a predetermined angle to each another.

In various embodiments, the processor 102 may be configured to calculate disparity values between corresponding images of the signal R_IMAGES and the signal L_IMAGES. In an example, the disparity values may be utilized for object detection and/or reconstruction. In another example, the disparity values may be utilized for object tracking, depth measurement, object speed and/or motion determination, etc. In general, disparity comprises depth information that may be utilized in any application needing three-dimensional (3D) information (e.g., 3D reconstruction). In an example, the processor 102 may utilize the disparity to determine when changes in or intrusion into the 3D virtual security zone 101 have occurred. In another example, the processor 102 may be configured to generate the disparity information for just the 3D virtual security zone 101 in order to reduce computation costs and increase response speed. In an example, when the processor 102 determines changes in or intrusion into the 3D virtual security zone 101 have occurred, the processor 102 may generate (or assert) the signal TRIGGER.

In an example embodiment, the processor 102 may further comprise a block (or circuit) 152, a block (or circuit) 154, and a block (or circuit) 156. The block 152 may implement a disparity engine. The block 154 may implement object detection/reconstruction. The block 156 may be implemented using an artificial neural network (ANN). In an example embodiment, the block 156 may be implemented as a convolutional neural network (CNN) or a deep convolutional neural networks (DCNN). In an example embodiment, the block 156 may be implemented as a generator network. In an example, the neural network of the block 156 may be implemented using a directed acyclic graph (DAG) and a corresponding set of weights 156a. In an example embodiment, the DAG may be executed using the hardware engines 190a-190n of the processor 102. In an example, the corresponding set of weights 156a may be determined using an unsupervised training process. Details of unsupervised training process may be described in association with U.S. patent application Ser. No. 16/951,257, filed on Nov. 18, 2020, appropriate portions of which are hereby incorporated by reference in their entirety.

In an example embodiment, the circuit 152 may be implemented using any hardware, software, and/or combination of hardware and software that calculates disparity, including, but not limited to, conventional disparity calculating circuitry. In an example, hardware implementations of the circuit 152 may include, but are not limited to, field programmable gate arrays (FPGAs) and application specific integrated circuits (ASICs). In an example embodiment, the circuit 154 may be implemented using any hardware, software, and/or combination of hardware and software that detects and/or reconstructs objects within images, including, but not limited techniques to, conventional for detecting and/or reconstructing objects. In an example, hardware implementations of the circuit 154 may include, but are not limited to, field programmable gate arrays (FPGAs) and application specific integrated circuits (ASICs).

In an example embodiment, the block 156 may be implemented as a generative neural network model. In various embodiments, the block 156 may be utilized during both training and inference (deployment) phases of the processor 102. In an example, the block 156 may be used in conjunction with a discriminative neural network model during the training phase. Details of unsupervised training process utilizing a discriminative neural network model may be described in association with U.S. patent application Ser. No. 16/951,257, filed on Nov. 18, 2020, appropriate portions of which are hereby incorporated by reference in their entirety. In some embodiments, the discriminative neural network model may be present but inactive after deployment. In various embodiments, the block 156 may have an input that may receive a number of scaled disparity maps (e.g., a disparity map for each scale of a disparity map pyramid) and an output that may present a fused disparity map. The fused disparity map may be generated by the block 156 from the number of scaled disparity maps based on the weights 156a.

In an example embodiment, the circuit 152 may have a first input that may receive the signal R_IMAGES, a second input that may receive the signal L_IMAGES, and an output that may communicate the number of scaled disparity maps to the block 156. The output of the block 156 may be coupled to an input of the block 154. In an example embodiment, the signals R_IMAGES and L_IMAGES may be communicated to the circuit 156 using one or more memories or buffers (not shown). In another example, the signals R_IMAGES and L_IMAGES may also be communicated to the block 156 to further improve the fused disparity values generated by the block 156. In an example, the processor 102 may utilize the fused disparity map and results of the object detection/reconstruction to determine when changes in or intrusion into the 3D virtual security zone 101 have occurred. In another example, the processor 102 may be configured to generate the fused disparity information for just the 3D virtual security zone 101 in order to reduce computation costs and increase response speed. In an example, when the processor 102 determines changes in or intrusion into the 3D virtual security zone 101 have occurred, the processor 102 may generate (or assert) the signal TRIGGER.

Figure 6:
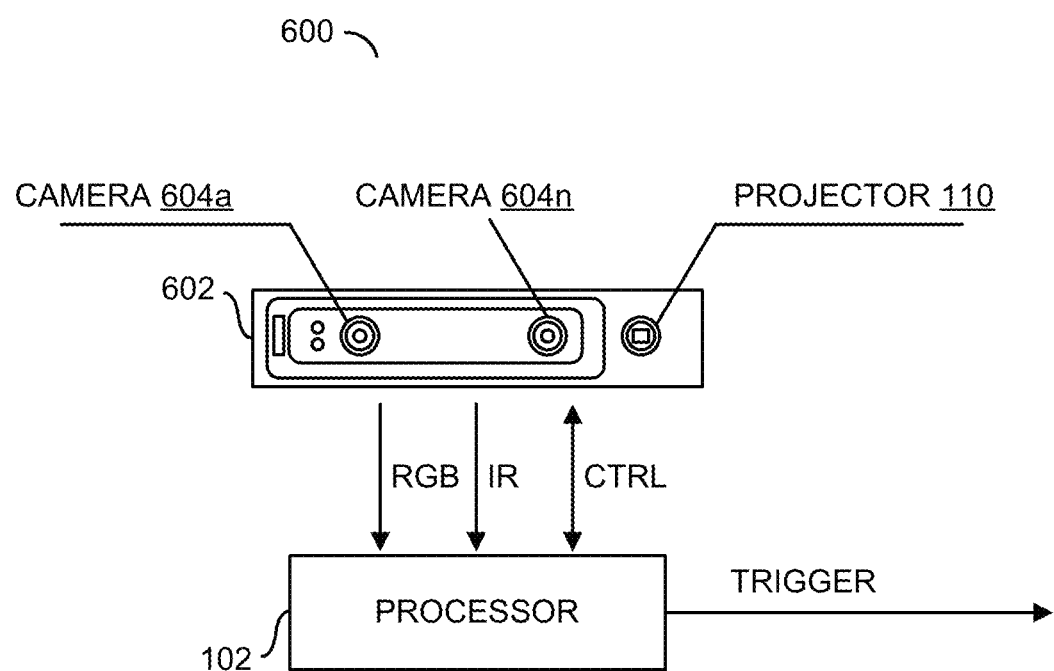
FIG. 6 is a diagram illustrating a structured light camera system in accordance with another example embodiment of the invention.

Referring to FIG. 6, a diagram is shown illustrating a structured light camera system 600 in accordance with another example embodiment of the invention. In an example, the structured light camera system 600 may be used to implement the camera system 100. In an example, the structured light camera system 600 may include a housing 602, a first camera 604a, a second camera 604n, the processor 102, and the infrared (IR) structured light projector 110. The camera 604a may include an RGB image sensor 104a and the lens 108a. The camera 604n may include an IR image sensor 104n and the lens 108n. The infrared (IR) structured light projector 110, including the lens 112, the camera 604a, including the lens 108a and the capture device 104a, and the camera 604n, including the lens 108n and the capture device 104n, may be mounted in the housing 602. In one example, the processor 102 may also be mounted within the housing 602. In another example, the processor 102 may be located externally or remotely to the housing 602.

The IR structured light projector 110 may be configured, when turned on, to project a structured light pattern (SLP) on objects in the field of view of the stereo camera system 600. The IR image sensor 122n of the capture device 104n may be used to acquire IR image data (with and without the structured light pattern) for the objects in the field of view of the structured light camera system 600. The RGB image sensor of the capture device 104a may be used to acquire color (RGB) image data for the objects in the field of view of the structured light camera system 200.

In an example, the processor 102 may utilize RGB data from the RGB sensor of the capture device 104a for perception, 3D facial recognition, object detection, face detection, object identification, and facial recognition. In an example, the processor 102 may utilize IR image data with the structured light pattern from the IR sensor of the capture device 104n to perform determination, facial depth analysis, liveness and/or 3D recognition. In an example, the processor 102 may be configured to generate a disparity map. The IR image data without the structured light pattern present and the RGB image data without the structured light pattern present may be used to generate encoded (or compressed) video signals or bitstreams, and to perform object detection, face detection, object identification, and/or facial recognition. In an example, the processor 102 may utilize the disparity to determine when changes in or intrusion into the one or more 3D virtual security zone have occurred. In another example, the processor 102 may be configured to generate the disparity map for just the one or more 3D virtual security zones in order to reduce computation costs and increase response speed. In an example, when the processor 102 determines changes in or intrusion into the one or more 3D virtual security zones have occurred, the processor may generate (or assert) the signal TRIGGER.

Figure 7:
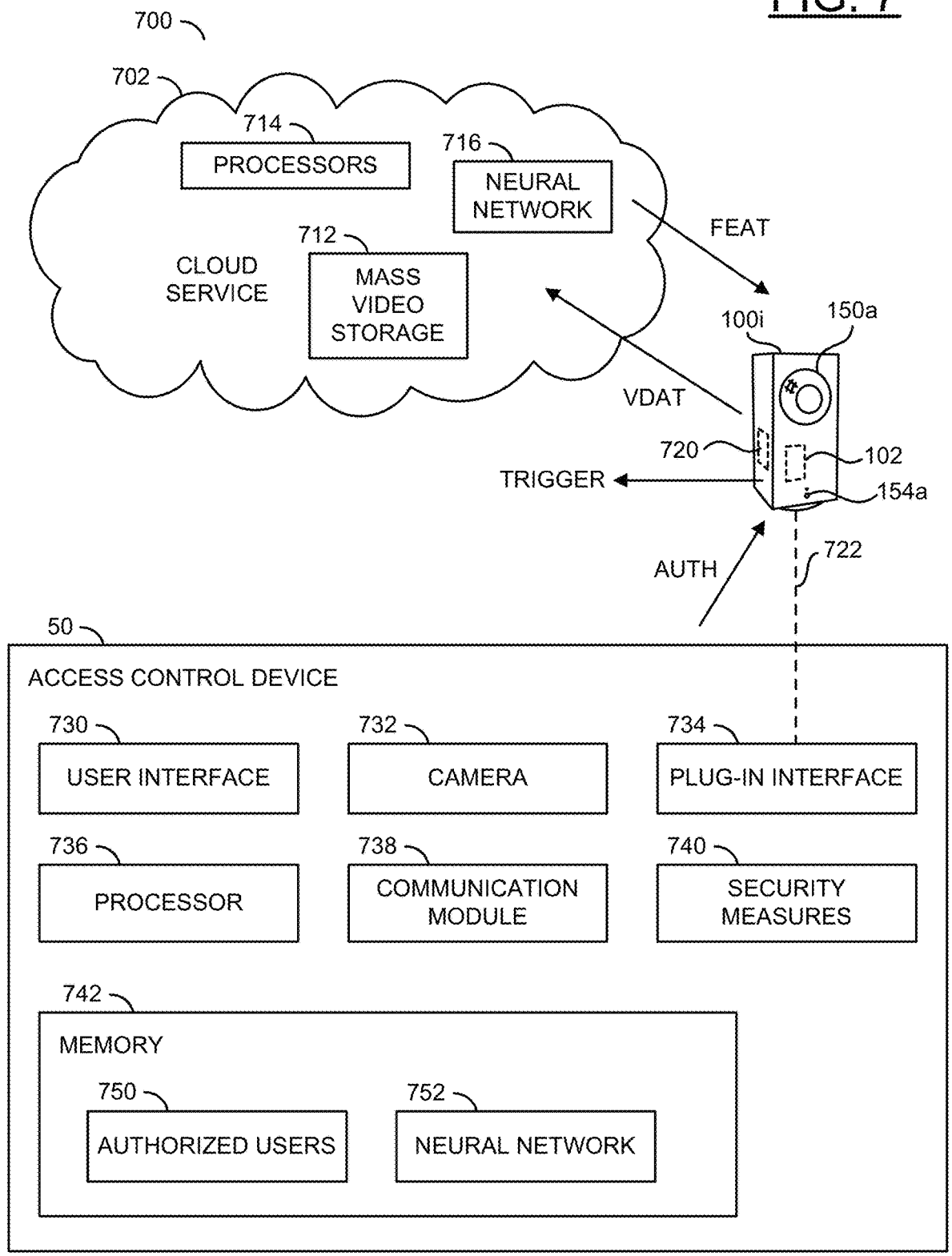
FIG. 7 is a diagram illustrating a camera communicating with a cloud server and an access control device.

Referring to FIG. 7, a diagram illustrating a camera communicating with a cloud server and an access control device is shown. A system 700 is shown. The system 700 may comprise an access control device 50, a camera system 100i and/or a server 702. In an example, the camera system 100i may include a lens 150a and a microphone 154a. The processor 102 is shown within the camera system 100i.

The server 702 may implement a cloud service. The cloud service 702 may comprise a block (or module) 712, a block (or module) 714 and/or a block (or module) 716. The module 712 may implement mass video storage. The module 714 may implement one or more processors. The module 716 may implement a neural network. The mass video storage 712 and/or the neural network 716 may be implemented using one or more types of memory implemented by the cloud service 702. The cloud service 702 may comprise other components (not shown). The number, type and/or arrangement of the components of the cloud service 702 may be varied according to the design criteria of a particular implementation.

The cloud service 702 may be implemented as part of a cloud computing platform (e.g., distributed computing). In an example, the cloud service 702 may be implemented as a group of cloud-based, scalable server computers. By implementing a number of scalable servers, additional resources (e.g., power, processing capability, memory, etc.) may be available to process and/or store variable amounts of data. For example, the cloud service 702 may be configured to scale (e.g., provision resources) based on demand. The cloud service 702 may implement scalable computing (e.g., cloud computing). The scalable computing may be available as a service to allow access to processing and/or storage resources without having to build infrastructure.

In some embodiments, the cloud service 702 may be configured to provide resources such as training data and/or a database of feature maps (e.g., feature maps of recognized objects that may be used as a basis to perform object recognition and/or classification). Generating the feature maps may be performed by the cloud service 702 since the cloud service 702 may have access to a large amount of training data (e.g., all the video frames uploaded by multiple camera systems 100 and/or other devices). Feature maps and/or training data may be stored in the neural network 716. The neural network 716 may be configured to provide a feature set to the camera system 100*i* in response to the particular events and/or objects selected for detection. In one example, individual users may select different types of events and/or objects to detect (e.g., objects of interest). The types of feature sets provided to the camera system 100*i* may be varied depending on the objects of interest selected by each user.

In some embodiments, the cloud service 702 may be configured to provide storage resources. The mass video storage 712 may be configured to provide long-term storage of video data. For example, the cloud service 702 may comprise storage resources (e.g., hard drives, solid state drives, etc.) that enable considerably more storage capacity than available internally on the camera system 100*i*.

The cloud service 702 may have access to considerably more bandwidth capacity than the camera system 100*i*. The bandwidth capacity available to the cloud service 702 may enable the cloud service 702 to stream video to remote devices (e.g., smartphones, internet-connected TVs, laptops, desktop computers, etc.).

In an example, the camera 100*i* may implement an edge device with artificial intelligence (e.g., an edge AI camera). The edge AI camera 100*i* may be configured to communicate with the access control device 50, the remote cloud service 702 and/or other devices (e.g., smartphones). The edge AI camera 100*i* may be a representative example of any of the camera systems 100 and 100'. A block (or circuit) 720 and a physical connection 722 are shown. The circuit 720 may comprise a security response device. The physical connection 722 may enable communication between the camera system 100*i* and the access control device 50.

The security response device 720 may be configured to perform a security response based on decisions made by the processor 102. In an example, the security response device 720 may be activated by the signal TRIGGER. For example, the signal TRIGGER may be used internally by the camera system 100*i* to perform a security measure. In one example, the security measure implemented by the security response device 720 may be an audio alarm. In another example, the security measure implemented by the security response device 720 may be a light. The type of the security response device 720 may be varied according to the design criteria of a particular implementation.

In some embodiments, the camera system 100*i* may communicate with the cloud service 702 and/or the access control device 50 wirelessly. In some embodiments, the camera system 100*i* may communicate with the cloud service 702 and/or the access control device 50 via the physical connection 722 (e.g., an ethernet connection, a USB connection, a wire, etc.).

The edge AI camera 100*i* is shown communicating a signal VDAT and the signal TRIGGER. The edge AI camera 100*i* is shown receiving a signal FEAT and/or a signal AUTH. The signal VDAT may comprise video frames generated by the processor 102 in response to the pixel data RAW_VIDEO_A-RAW_VIDEO_N. The signal AUTH may be an authentication signal generated by the access control device 50. The edge AI camera 100*i* may be configured to communicate and/or generate other signals (not shown). The number, type and/or format of the signals communicated and/or generated by the edge AI camera 100*i* may be varied according to the design criteria of a particular implementation.

The edge AI camera 100*i* may be configured to upload the encoded video frames and/or the features extracted from the video frames (e.g., the signal VDAT) to the cloud service 702. In some embodiments, the edge AI camera 100*i* may encode the video frames and/or generate a low bitrate video stream (e.g., one of the multiple parallel bitstreams generated) before uploading to limit an amount of bandwidth consumed compared to uploading unencoded video frames. In some embodiments, the encoded video frames VDAT may comprise all of the video data generated by the edge AI camera 100*i*. In some embodiments, the signal VDAT may comprise feature points extracted from the video frames. In the example shown, the signal VDAT may be communicated to the cloud service 702. In some embodiments, the signal VDAT may be communicated to the access control device 50.

In some embodiments, the processors 714 and/or the neural network 716 may be configured to generate a machine readable DAG. The machine readable DAG may comprise a neural network and/or computer readable instructions that define the types of objects and/or events that may be detected by the processor 102 of the camera system 100*i*. For example, the machine readable DAG may be generated according to an application programming interface (API) (e.g., a format) compatible with the camera system 100*i*. The machine readable DAG may comprise one or more neural networks (e.g., each neural network may correspond to various types of objects to detect). The machine readable DAG may be provided to the camera system 100*i* in the signal FEAT.

The camera system 100*i* may receive the signal FEAT from the cloud service 702. The processor 102 may convert the feature set information in the signal FEAT to detection parameters. The camera system 100*i* may capture pixel data and generate the video frames from the pixel data RAW_VIDEO_A-RAW_VIDEO_N. The processor 102 may process the pixel data arranged as video frames using the detection parameters received in the signal FEAT.

The processor 102 may receive the feature set signal FEAT to detect objects/events. The edge AI camera 100*i* may be configured to upload the encoded video frames to the cloud service 702. The encoded video frames VDAT may be stored in the mass video storage 712 of the cloud service 702. In some embodiments, the processors 714 may transcode the video frames received from the camera system 100*i* and then perform computer vision operations on the video frames based on the neural network 716. Based on the results of the computer vision operations, the processors 714 may generate a security measure (e.g., sound an alarm, present a notification to a security guard, initiate a lockdown procedure, etc.).

The access control device 50 may comprise a block (or circuit) 730, a block (or circuit) 732, a block (or circuit) 734, a block (or circuit) 736, a block (or circuit) 738, a block (or circuit) 740 and/or a block (or circuit) 742. The circuit 730 may implement a user interface. The circuit 732 may implement a camera and/or a sensor. The circuit 734 may implement a plug-in interface. The circuit 736 may implement a processor. The circuit 738 may implement a communication module. The circuit 740 may implement security measures. The access control device 50 may comprise other components (not shown). The number, type and/or arrangement of the components of the access control device 50 may be varied according to the design criteria of a particular implementation.

The user interface 730 may enable the users to provide input to the access control device 50 and/or enable the access control device 50 to present output to the users. In one example, the user interface 730 may comprise a display and/or a keypad. For example, the user interface 730 may be one component of the access control device 50 that may be configured to receive the credentials presented by the user.

The camera 732 may be one example of a sensor implemented by the access control device 50. The camera 732 may be one example component of the access control device 50 that may be configured to receive the credentials presented by the user. In an example, the camera 732 may be configured to capture an image of an ID card to perform authentication.

The plug-in interface 734 may enable various peripherals to connect to access control device 50. The plug-in interface 734 may comprise a standard connector (e.g., a USB connection) and/or a proprietary connector. In the example shown, the plug-in interface 734 may be connected to the physical connector 722 to enable communication between the access control device 50 and the camera system 100*i*. The plug-in interface 734 may enable extensible functionality to be added to the access control device 50 via an API. In the example shown, the camera system 100*i* may provide the extensible functionality of computer vision to the access control device 50. In one example, the plug-in interface 734 may enable the access control device 50 to communicate the signal AUTH to the camera system 100*i*. In another example, the plug-in interface 734 may enable the camera system 100*i* to communicate the signal TRIGGER to the access control device 50. In yet another example, the plug-in interface 734 may enable the camera system 100*i* to communicate the signal VDAT (e.g., video frames and/or feature points extracted from the video frames) to the access control device 50. The types of data communicated and/or the types of devices that may extend the functionality of the access control device 50 via the plug-in interface 734 may be according to the design criteria of a particular varied implementation.

The processor 736 may enable the access control device 50 to execute computer readable instructions, read data, generate outputs in response to input, etc. The processor 736 may be configured to determine whether a user is authorized to enter the one or more 3D virtual security zones. The authorization signal AUTH may be generated in response to decisions made by the processor 736.

The communication module 738 may be configured to send data to and/or receive data from external devices (e.g., the cloud server 702 and/or the camera system 100*i*). The communication module 738 may be configured to communicate via various communication protocols (e.g., Wi-Fi, Bluetooth, ZigBee, etc.). In one example, the communication module 738 may be configured to communicate the signal AUTH to the camera system 100*i*. In another example, the communication module 738 may be configured to receive the signal TRIGGER and/or the signal VDAT from the camera system 100*i*.

The security measures 740 may comprise various components (e.g., actuators, output devices, etc.) that may be used as responses that may be performed by the access control device 50. The security measures 740 may be performed in response to decisions made by the processor 736. In one example, the security measures 740 may be performed in response to detecting the credentials. In another example, the security measures 740 may be performed in response to the signal TRIGGER generated by the camera system 100*i*. In yet another example, the security measures 740 may be performed in response to computer vision operations performed by the access control device 50. The security measures 740 may comprise an audio alarm, communicating a notification (e.g., a warning about a detected intruder), flashing a light, initiating a lockdown, etc.). The security measures 740 performed by the access control device 50 may be similar to the security measures that may be performed by the security response device 720 of the camera system 100*i*.

The memory 742 may comprise local storage for the access control device 50. The memory 742 may comprise embedded flash memory, RAM, a hard drive, a solid state drive, a cache, etc. The memory 742 may comprise computer readable instructions that may be executed by the processor 736. The memory 742 may comprise storage for the video data communicated via the signal VDAT.

The memory 742 may comprise a block (or circuit) 750 and/or a block (or circuit) 752. The circuit 750 may comprise authorized users storage. The circuit 752 may comprise a neural network. The memory 742 may comprise other components (not shown). The number, type and/or arrangement of the components of the memory 742 may be varied according to the design criteria of a particular implementation.

The authorized users storage 750 may comprise a database of people that may be permitted to enter the one or more 3D virtual security zones. The authorized users storage 750 may comprise credentials and/or user IDs. The processor 736 may be configured to compare the credentials received via the user interface 730 and/or the camera 732 with the credential data stored in the authorized users storage 750. The processor 736 may generate the signal AUTH in response to a match between the credentials received and one of the entries of the credential data stored in the authorized users storage 750.

The neural network 752 may enable the access control device 50 to perform computer vision operations. In some embodiments, the access control device 50 may receive the video data VDAT from the camera system 100*i*, perform computer vision operations on the video data using the neural network 752 and perform one of the security measures 740 in response to the number of people detected. In some embodiments, the neural network 752 may be configured to generate the feature set for the camera system 100*i* and communicate the signal FEAT to the camera system 100*i*. The access control device 50 may be configured to generate the signal AUTH in response to determining that the credentials presented are authorized. The signal AUTH may be used internally by the access control device 50. For example, the signal AUTH may be presented to one of the security measures 740 that may be configured to unlock a door to enable a person access to the one or more 3D virtual security zones.

The access control device 50 may communicate the signal AUTH to the camera system 100*i* (e.g., wirelessly using the communication module 738 or via the physical connection 722). The signal AUTH may comprise information about the people authorized to enter the one or more 3D virtual security zones. In one example, the signal AUTH may comprise a number of people permitted to enter the one or more 3D virtual security zones. In some embodiments, the access control device 50 may indicate that one person is allowed to enter the one or more 3D virtual security zones when the authorized credentials are detected. In some embodiments, the access control device 50 may indicate that more than one person is allowed to enter the one or more 3D virtual security zones when the authorized credentials are detected (e.g., an employee giving a tour of the one or more 3D virtual security zones to multiple people). The CNN module 190b may use the number of people provided by the signal AUTH to determine whether a matching number of people have been detected attempting to enter the one or more 3D virtual security zones and/or have entered the one or more 3D virtual security zones. In some embodiments, the signal AUTH may comprise feature points of faces associated with the credentials and the CNN module 190b may perform facial recognition to determine whether the face of a detected person matches the face associated with the credentials.

In some embodiments, the camera system 100i may be configured to be implemented as a standalone camera/sensor (e.g., a standalone device capable of operating independent from the access control device 50). The camera system 100i may be configured to receive the authorization signal AUTH from the access control device 50 and the CNN module 190b may be configured to perform the computer vision operations to detect the number of people near the one or more 3D virtual security zones (e.g., determine how many people are attempting to enter the one or more 3D virtual security zones). The processor 102 may generate the control signal TRIGGER in response to detecting more people attempting to enter the one or more 3D virtual security zones than the number of people permitted as indicated by the signal AUTH. In some embodiments, the control signal TRIGGER may be used to activate the security response device 720 implemented by the camera system 100i (e.g., the detection of the people and the security measure may all be performed locally by the camera system 100i). In some embodiments, the signal TRIGGER may be communicated to the access control device 50 and the access control device 50 may activate one of the security measures 740 (e.g., the detection of the people may be performed locally by the camera system 100i and the security measure may be performed by the access control device 50). In some embodiments, the signal TRIGGER may be communicated to the cloud service 702 and the cloud service 702 may activate a security measures (e.g., the detection of the people may be performed locally by the camera system 100i and the security measure may be performed by the cloud service 702).

In some embodiments, the camera system 100i may be implemented as an accessory that may be plugged into (or communicate wirelessly with) the access control device 50. For example, the connection may be via the physical connection 722 (e.g., USB, proprietary connectors) and/or wirelessly (e.g., Bluetooth, ZigBee, Wi-Fi, a proprietary protocol, etc.). For example, the camera system 100i may communicate the video data VDAT in response to the signal AUTH. The processor 736 and the neural network 752 implemented by the access control device 50 may perform the computer vision operations to determine whether the number of people detected in the video frames generated by the camera system 100i matches the number of people authorized to enter the one or more 3D virtual security zones. In some embodiments, the camera system 100i may be configured to generate the video frames of the entrance of the one or more 3D virtual security zones and/or extract features from the video frames, and the access control device 50 may be configured to perform the computer vision operations to determine the number of people and perform the security response.

In some embodiments, the camera system 100i may communicate the video data VDAT to the cloud service 702 in response to the signal AUTH. The processors 714 and the neural network 716 implemented by the cloud service 702 may perform the computer vision operations to determine whether the number of people detected in the video frames generated by the camera system 100i matches the number of people authorized to enter the one or more 3D virtual security zones. In response to detecting a change in or an intrusion within the one or more 3D virtual security zones, the cloud service 702 may activate a security measure (or communicate a control signal for activating a security measure to the camera system 100i and/or the access control device 50). In some embodiments, the camera system 100i may be configured to generate the video frames of the entrance of the one or more 3D virtual security zones and/or extract features from the video frames, and the cloud service 702 may be configured to perform the computer vision operations to determine the number of people and perform the security response.

Generally, the processor 102 may be configured to implement the CNN module 190b and the camera system 100i may be configured to have the processing capabilities to perform the computer vision operations (e.g., detect objects, extract characteristics about the objects, determine a number of people in the video frames, determine when the number of people is greater than a number of entrants permitted by the authorization signal AUTH, etc.) locally. In some embodiments, the camera system 100i may be configured to offload the processing of the computer vision operations to the processors 714 and/or the neural network 716 of the cloud service 702. In some embodiments, the camera system 100i may be configured to offload the processing of the computer vision operations to the processor 736 and/or the neural network 752 of the access control device 50. For example, the cloud service 702 may comprise scalable resources that may be capable of greater processing than the processor 102 implemented by the camera system 100i. In another example, the processor 102 may have access to less power (e.g., powered by the battery 120), while the access control device 50 may be connected to a power outlet for a constant power supply to enable greater resources for performing the computer vision operations. Generally, the computer vision operations may be described as being performed by the processor 102 and the CNN module 190b. However, the processors 714 and the neural network 716 of the cloud services 702 and/or the processor 736 and the neural network 752 of the access control device 50 may have similar capabilities. Which operations are performed by which component of the system 700 may be varied according to the design criteria of a particular implementation.

In some embodiments, the memory 106 may be configured to store a full recording (e.g., a full video stream) of the video data captured by the camera system 100i. The video frames generated may be processed using the hardware modules 190a-190n (e.g., to process, encode, adjust, de-warp, perform rolling shutter correction, compress, etc.). The video frames may be analyzed by the CNN module 190b. The CNN module 190b may comprise an AI model (e.g., the DAG). The CNN module 190b may be configured to detect objects, determine a number of people, determine whether a person is attempting to cross the threshold of the house 90, etc. The AI model may be configured to implement the machine readable DAG to detect various objects and/or events.

The CNN module 190b may be configured to tag the video frames with metadata. The metadata may comprise a timestamp and/or information about the people detected in the video frames. In one example, the metadata may comprise the number of people detected in the video frames. In another example, the metadata may comprise characteristics about each of the people (e.g., information that may be used for person detection and/or facial recognition). In yet another example, the metadata may comprise movement direction information about each object detected. The type of data tagged in the metadata may be varied according to the design criteria of a particular implementation. In some embodiments, the metadata tags may be used to generate training data (e.g., the metadata tags may be tagged as correct and/or incorrect based on whether the metadata tags accurately identify the objects, events and/or characteristics). The training data may be used to refine the feature set used to detect objects (e.g., to adjust neural network weight values and/or bias values for the AI model).

The CNN module 190b may be configured to perform object detection, classify objects, and/or extract data from the video frames. The CNN module 190b may compare the data extracted (e.g., various symbols and/or confidence values indicating the likelihood that particular objects were detected) with the detection parameters (e.g., the feature set information) of the signal FEAT according to the machine readable DAG to determine whether or not an object and/or event of interest has been detected. In an example, the feature set signal FEAT may provide instructions for distinguishing between two people that are close together. In some embodiments, the CNN module 190b and/or audio analytics modules may determine when an object of interest and/or event has been detected. For example, the event may comprise an amplitude and/or type of audio detected, an event and/or object detected using computer vision operations and/or a combination of audio and video analysis (e.g., using computer vision to detect people and using audio analysis to determine if there is more than one person is making noise, detecting multiple sets of footsteps compared to the number of people visible in the video frames, etc.).

The processor 102 may implement the CNN module 190b. The CNN module 190b may be a hardware component (or multiple hardware components working together) of the processor 102 that implements CNN-based detection techniques (or other types of detection techniques) that operate entirely on the processor 102 to perform computer vision operations such as object detection, object tracking, object classification, facial recognition, etc. The hardware accelerated CNN module 190b may enable the object/event detection to be performed on the camera system 100i (e.g., without relying on computing resources of the cloud server 702 to perform object detection).

In some embodiments, the processor 102 may use software acceleration for computer vision and/or a combination of hardware accelerated and software accelerated computer vision. With computer vision operations running on either a hardware based CNN engine 190b and/or a software based CNN engine, the processor 102 implemented in the edge device 100i may be able to detect the number of people and apply the data to the video frames captured. Performing the computer vision operations locally to the camera system 100i may conserve bandwidth (e.g., the video frames may not need to be communicated to the access control device 50 or the cloud service 702) and/or enable efficient processing (e.g., the video frames may need to be encoded to send to the cloud service 702 and the cloud service 702 may need to transcode the encoded video frames before performing the computer vision operations).

The access control device 50 may be configured to grant access to an authorized user. The camera system 100i may be mounted over garage door (or with a view of a threshold of the house 90) with a view of the one or more 3D virtual security zones. The camera system 100i may implement an ANN and/or use depth data (e.g., captured using a time-of-flight sensor) to detect if there is one person only that is entering the one or more 3D virtual security zones (e.g., compare the number of people authorized by the signal AUTH to the number of people detected in the video frames). If the camera system 100i detects more people than authorized to enter the one or more 3D virtual security zones (e.g., more than one person), the processor 102 may determine that unauthorized access has been detected. The processor 102 may generate the signal TRIGGER. The signal TRIGGER may be configured to report that there has been an unauthorized access detected to the one or more 3D virtual security zones. In an example, the signal TRIGGER may be presented to the access control device 50, which may trigger alerts and/or notifications.

Figure 8:
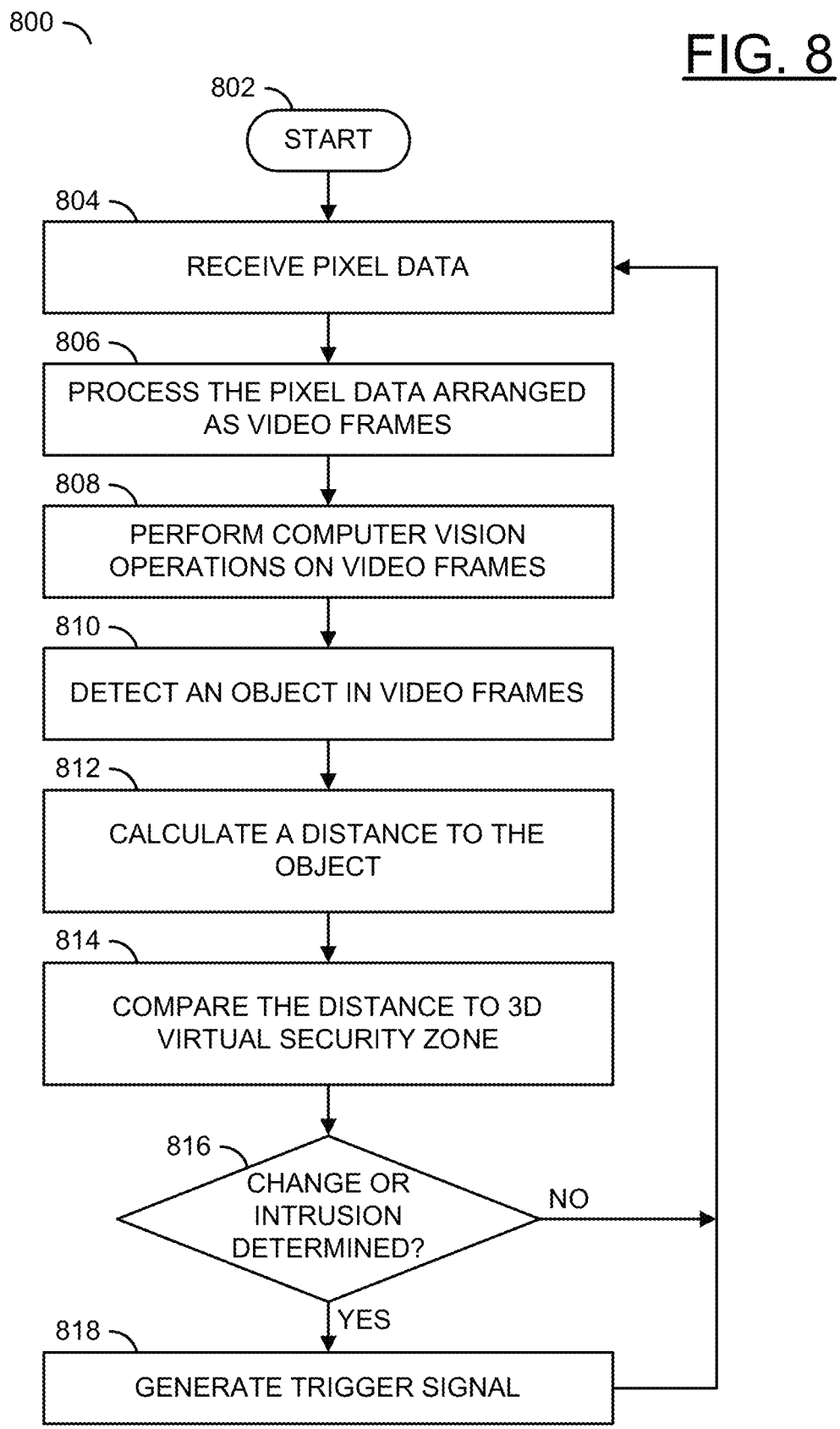
FIG. 8 is a flow diagram illustrating an example method for generating a trigger signal in response to detecting a change in a 3D virtual security zone.

Referring to FIG. 8, a method (or process) 800 is shown. The method 800 may automatically detect a change in or intrusion within a 3D virtual security zone. The method 800 generally comprises a step (or state) 802, a step (or state) 804, a step (or state) 806, a step (or state) 808, a step (or state) 810, a step (or state) 812, a step (or state) 814, a decision step (or state) 816, and a step (or state) 818.

The step 802 may start the method 800. In the step 804, the processor 102 may receive pixel data. The pixel data may correspond to a field of view from the camera system 100. In some embodiments, the pixel data may be the signals RAW_VIDEO_A-RAW_VIDEO_N presented by the capture devices 104a-104n. In some embodiments, the processor 102 may generate video frames (e.g., FRAMES_A-FRAMES_N) from the received pixel data. In some embodiments, the processor 102 may receive video frame data directly from the capture devices 104a-104n. Next, in the step 806, the processor 102 may process the pixel data arranged as video frames. For example, one or more of the dedicated hardware modules 190a-190n and/or a video processing pipeline may generate video frames from the signals RAW_VIDEO_A-RAW_VIDEO_N. Next, the method 800 may move to the step 808.

In the step 808, the processor 102 may perform computer vision operations on the video frames. In an example, the video frames may be presented to the CNN module 190b as the video frames are generated to enable real-time computer vision operations. Next, in the step 810, the CNN module 190b may perform object detection and/or determine the characteristics of the objects detected. The object detection, along with classification and/or segmentation, may be part of the computer vision operations performed by the CNN module 190b. The object detection may comprise detecting an object for use in other steps of the method 800. Next, the method 800 may move to the step 812.

In the step 812, the processor 102 may calculate a distance to the object (e.g., using disparity data, ToF data, etc.). Next, the method 800 may move to the step 814. In the step 814, the processor 102 may compare the distance calculated in the step 812 to one or more 3D virtual security zones. In one example, the 3D virtual security zones may have been defined by the user/homeowner during a setup procedure. In another example, the user/homeowner may accept or modify one or more default 3D virtual security zones programmed into the camera system 100.

Next, the method 800 may move to the decision step 816. In the decision step 816, the processor 102 may determine whether there has been a change in or an intrusion into the one or more 3D virtual security zones. In response to a determination that there has been a change in or an intrusion into the one or more 3D virtual security zones, the method 800 may move to the step 818. In response to a determination that there has not been a change in or intrusion into the one or more 3D virtual security zones, the method 800 generally returns to the step 804. In the step 818, the processor 102 may generate a trigger signal based on the change in or intrusion into the one or more 3D virtual security zones being determined. The trigger signal (e.g., TRIGGER) may enable and/or disable one or more of a notification, a security system, and/or a siren.

Figure 9:
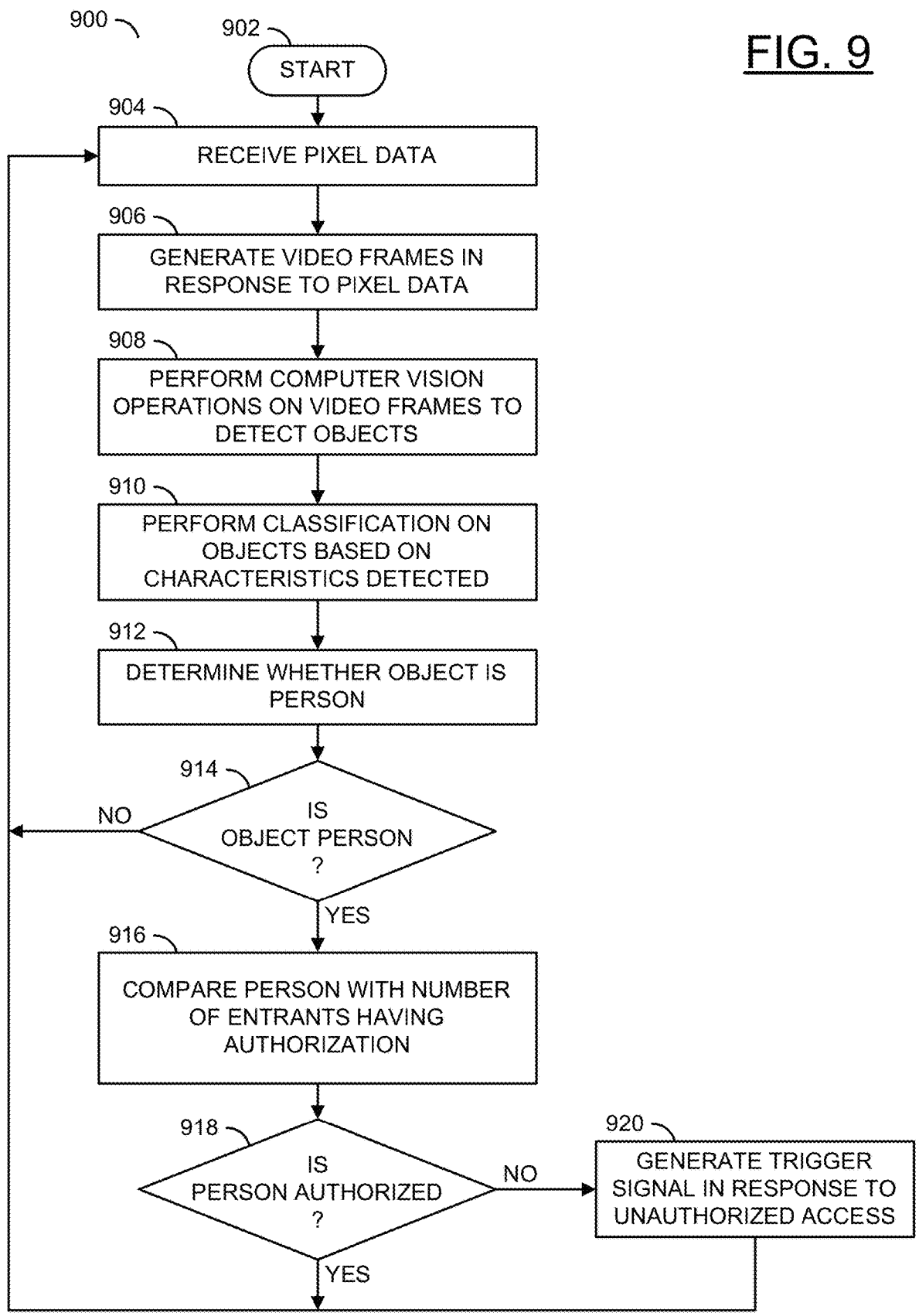
FIG. 9 is a flow diagram illustrating an example method for generating a trigger signal in response to detecting an unauthorized person in a 3D virtual security zone.

Referring to FIG. 9, a method (or process) 900 is shown. The method 900 may automatically detect an unauthorized change in or intrusion within a 3D virtual security zone. The method 900 generally comprises a step (or state) 902, a step (or state) 904, a step (or state) 906, a step (or state) 908, a step (or state) 910, a step (or state) 912, a decision step (or state) 914, a step (or state) 916, a decision step (or state) 918, and a step (or state) 920. The step 902 may start the method 900. The method 900 may then move to the step 904.

In the step 904, the processor 102 may receive pixel data. In an example, one or more of the capture devices 104a-104n may present the signals RAW_VIDEO_A-RAW_VIDEO_N to the processor 102. The pixel data captured may comprise the area within the field of view of the camera system 100. Next, in the step 906, the processor 102 may generate video frames from the pixel data. For example, one or more of the dedicated hardware modules 190a-190n may generate video frames from the signals RAW_VIDEO_A-RAW_VIDEO_N. Next, the method 900 may move to the step 908.

In the step 908, the processor 102 may perform computer vision operations on the video frames. In an example, the CNN module 190b may receive the video frames as generated to enable real-time computer vision operations. Next, in the step 910, the CNN module 190b may perform object detection and/or determine the characteristics of the objects detected. The object detection, along with classification and/or segmentation may be part of the computer vision operations performed by the CNN module 190b. In the step 912, the CNN module 190b may determine whether an object detected in the video frames is a person. The determination of whether the object is a person may be performed based upon the characteristics and/or classifications performed using the computer vision operations. Next, the method 900 may move to the decision step 914.

In the decision step 914, the processor 102 may check whether a person has been detected. When a person has not been detected, the method 900 generally returns to the step 904. When a person has been detected, the method 900 may move to the step 916. In the step 916, the method 900 may compare the person detected with a number of persons (entrants) that are authorized to enter the one or more 3D virtual security zones. The method 900 may then move to the decision step 918. In the decision step 918, the processor 102 may determine whether the person detected is authorized. When the person detected is authorized, the method 900 may return to the step 904 and continue monitoring the one or more 3D virtual security zones. When the person detected is not authorized, the method 900 may move to the step 920. In the step 920, the processor 102 may generate the signal TRIGGER in response to the person detected being an unauthorized intrusion.

Referring to FIG. 10, a method (or process) 1000 is shown. The method 1000 may be performed to set up one or more 3D virtual security zones. The method 1000 generally comprises a step (or state) 1002, a step (or state) 1004, a step (or state) 1006, a step (or state) 1008, a step (or state) 1010, a decision step (or state) 1012, a decision step (or state) 1014, and a step (or state) 1016.

The step 1002 may start the method 1000. In the step 1004, the processor 102 may receive pixel data. The pixel data may correspond to a field of view from the camera system 100. In some embodiments, the pixel be data may the signals RAW_VIDEO_A-RAW_VIDEO_N presented by the capture devices 104a-104n. In some embodiments, the processor 102 may generate video frames (e.g., FRAMES_A-FRAMES_N) from the received pixel data. In some embodiments, the processor 102 may receive video frame data directly from the capture devices 104a-104n. Next, in the step 1006, the processor 102 may process the pixel data arranged as video frames. For example, one or more of the dedicated hardware modules 190a-190n and/or a video processing pipeline may generate video frames from the signals RAW_VIDEO_A-RAW_VIDEO_N. Next, the method 1000 may move to the step 1008.

In the step 1008, the processor 102 may receive parameters defining one or more 3D virtual security zones. In one example, the 3D virtual security zone(s) may be defined by the user/homeowner entering specific 3D spatial coordinates (e.g., A, B, C, E, H) in response to one or more prompts. In an example, the user/homeowner may be prompted to enter the coordinates of a number of vertices of each of the one or more 3D virtual security zones and a height of each of the one or more 3D virtual security zones. In another example, the 3D virtual security zone(s) may be defined by the user/homeowner entering specific 3D spatial coordinates of an anchor point (e.g., A) along with a width parameter (e.g., W), a height parameter (e.g., H), and a depth parameter (e.g., D) parameter.

In the step 1010, the method 1000 may display a representation of the 3D virtual security zone(s) defined by the parameters entered by the user/homeowner overlaid on a displayed image from the security camera 100 and/or doorbell camera 100'. In the decision step 1012, the method 1000 may determine whether the user/homeowner wants to modifying the displayed 3D virtual security zone. When the user/homeowner choose to modify the 3D virtual security zone, the method 1000 may move to the step 1008 to receive new parameters for defining the modified 3D virtual security zone. When the user/homeowner does not choose to modify the 3D virtual security zone, the method 1000 may move to the step 1014. In the step 1014, the method 1000 generally checks to see whether another 3D virtual security zone is to be defined. In an example, the user/homeowner may be prompted (queried) whether another 3D virtual security zone is to be defined.

When the user/homeowner indicates that another 3D virtual security zone is to be defined, the method 1000 moves to the step 1008 to receive the parameters for defining the additional 3D virtual security zone. When the user/homeowner indicates that another 3D virtual security zone is not to be defined, the method 1000 may move to the step 1016 and terminate. In an example, the 3D virtual security zone(s) may be defined by default values and the default values may be used to display representations of the default 3D virtual security zone(s). The user/homeowner may then be prompted to modifying the default values. In an example, a default representation of the 3D virtual security zone(s) may be overlaid on a displayed image from the security camera 100 and/or doorbell camera 100'.

In an example, the user/homeowner may be enabled (e.g., through a user interface on a cellphone or other personal computing device) to define the 3D virtual security zone(s). In another example, the user/homeowner may be further enabled (e.g., through the user interface on the cellphone or other personal device) to modify the 3D virtual security zone(s). In an example, the user/homeowner may be enabled to modify the displayed 3D virtual security zone(s) by moving lines indicating boundaries of the default 3D virtual security zone(s) until the representation encompasses a desired volume (or volumes) in a field of view of the security cameras and/or doorbell cameras. In still another example, the 3D virtual security zone(s) may be defined by the user/homeowner moving to various positions within the field of view of the security camera and/or 100 doorbell camera 100' corresponding to the vertices of the area upon which the 3D virtual security zone is to be based, and marking each of the locations (e.g., through the user interface on the cellphone or other personal device). In another example, the user/homeowner may be enabled to program a number of 3D virtual security zones, which the security camera 100 and/or doorbell camera 100' may automatically switch between (e.g., based on time of day, day of week, presence of pre-defined objects, etc.).

The functions and structures illustrated in the diagrams of FIGS. 1 to 10 may be designed, emulated, implemented, modeled, and/or simulated using one or more of a conventional general purpose processor, a digital computer, a microprocessor, a microcontroller, a RISC (reduced instruction set computer) processor, a CISC (complex instruction set computer) processor, a SIMD (single instruction multiple data) processor, a signal processor, a central processing unit (CPU), an arithmetic logic unit (ALU), a video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally embodied in a medium or several media, for example non-transitory storage media, and may be executed from the medium or several media, sequentially or in parallel, by one or more of the processors of the machine implementation.

Embodiments of the invention may also be implemented by preparation of one or more of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more chips or die arranged as flip-chip modules and/or multi-chip modules or by interconnecting an appropriate network of conventional component circuits, as is described herein, modifications of which will be readily apparent to those skilled in the art(s).

Embodiments of the invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMS (erasable programmable ROMs), EEPROMS (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A method of providing a virtual security zone comprising the steps of:
   receiving pixel data corresponding to a monitored area; and
   processing said pixel data arranged as video frames by
   (i) performing computer vision operations to detect an object in said video frames, wherein said computer vision operations are performed by (a) applying a feature detection window 8 to each of a plurality of layers in each of said video frames and (b) sliding said feature detection window along each of said plurality of layers,
(ii) extracting characteristics about said object detected,
(iii) generating a three-dimensional (3D) map of said object utilizing said pixel data corresponding to said object,
(iv) determining whether said object is within a three-dimensional (3D) virtual security zone based on said 3D map 17 of said object, wherein said 3D virtual security zone is determined by a user during a setup procedure, and
(v) generating a trigger signal in response to all or a portion of said object being within said 3D virtual security zone.

2. The method according to claim 1, further comprising: communicating said trigger signal to at least one of (i) a security system and (ii) an intrusion alarm.

3. The method according to claim 1, wherein performing said computer vision operations further comprises applying a convolution operation using matrix multiplication of said plurality of layers defined by said feature detection window.

4. The method according to claim 1, wherein performing said computer vision operations further comprises (i) performing feature extraction based on weight values for each of said plurality of layers in said video frames and (ii) said weight values are determined based on an analysis of training data performed prior to said feature extraction.

5. The method according to claim 1, wherein performing said computer vision operations further comprises analyzing at least one of (a) depth information and (b) disparity information to determine a position of said object relative to said 3D virtual security zone.

6. The method according to claim 5, further comprising generating said depth information using a time-of-flight sensor.

7. The method according to claim 5, further comprising generating said depth information using a structured light pattern.

8. The method according to claim 1, further comprising:
generating a disparity map of said 3D virtual security zone utilizing said pixel data of said video frames; and
determining depth coordinates of said 3D map of said object utilizing said disparity map.

9. The method according to claim 1, further comprising:
generating control signals to control a structured light projector and a camera, wherein said camera comprises one or more image sensors configured to generate said pixel data for a field of view of said camera and said structured light projector is configured to project a structured light pattern into said monitored area in response to one or more of said control signals; and
generating a disparity map of said 3D virtual security zone utilizing said structured light pattern contained in said pixel data of said video frames.

10. The method according to claim 9, wherein said one or more image sensors comprise at least one of an infrared (IR) image sensor, a color (RGB) image sensor, and an RGB-IR image sensor.

11. The method according to claim 1, further comprising: receiving (i) a first portion of said pixel data for a first field of view of a first camera comprising a first image sensor and (ii) a second portion of said pixel data for a second field of view of a second camera comprising a second image sensor, wherein said first camera and said second camera are arranged as a stereo camera pair; and
generating a disparity map of said 3D virtual security zone utilizing said first portion of said pixel data and said second portion of said pixel data arranged as said video frames.

12. The method according to claim 11, wherein said first image sensor and said second image sensor comprise one or more of an infrared (IR) image sensor, a color (RGB) image sensor, and an RGB-IR image sensor.

13. The method according to claim 1, wherein said 3D virtual security zone is defined by:
prompting said user to enter coordinates of a plurality of vertices of said 3D virtual security zone via a user interface;
receiving said plurality of vertices of said 3D virtual security zone via said user interface; and
displaying a representation of said 3D virtual security zone overlaid on an image of the monitored area.

14. The method according to claim 1, wherein said 3D virtual security zone is defined by:
prompting said user to enter one or more of coordinates and parameters defining said 3D virtual security zone via a user interface;
receiving coordinates of an anchor point of said 3D virtual security zone and a number of parameters defining dimensions of said 3D virtual security zone via said user interface; and
displaying a representation of said 3D virtual security zone overlaid on an image of the monitored area.

15. The method according to claim 14, wherein the number of parameters defining dimensions of said 3D virtual security zone comprise one or more of a height parameter, a width parameter and a depth parameter.

16. The method according to claim 1, wherein said 3D virtual security zone is defined by:
provide one or more default 3D virtual security zones; and
enabling said user to customize said one or more default 3D virtual security zones via a user interface.

17. The method according to claim 1, wherein said 3D virtual security zone is defined by:
providing one or more dynamically adjusted 3D virtual security zones; and
enabling said user to customize said one or more dynamically adjusted 3D virtual security zones.

18. The method according to claim 1, wherein said 3D virtual security zone is defined by:
enabling said user to define a plurality of dynamically selected 3D virtual security zones; and
switching between the plurality of dynamically selected 3D virtual security zones based on one or more of time of day, day of week, and presence of a predefined object.

19. The method according to claim 1, further comprising determining whether said object is a person.

20. The method according to claim 19, further comprising:
when said object is determined to be a person, further determining whether said person is authorized to enter said 3D virtual security zone.

* * * * *